US010280348B2

(12) United States Patent
Virnelson

(10) Patent No.: US 10,280,348 B2
(45) Date of Patent: May 7, 2019

(54) LOW DENSITY AEROSPACE COMPOSITIONS AND SEALANTS

(71) Applicant: PRC-DeSoto International, Inc., Sylmar, CA (US)

(72) Inventor: Bruce Virnelson, Valencia, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 15/420,138

(22) Filed: Jan. 31, 2017

(65) Prior Publication Data

US 2018/0215974 A1 Aug. 2, 2018

(51) Int. Cl.
| | |
|---|---|
| *C08L 63/00* | (2006.01) |
| *C09J 181/02* | (2006.01) |
| *C09J 11/04* | (2006.01) |
| *C09J 11/08* | (2006.01) |
| *C08G 59/66* | (2006.01) |
| *C08L 81/02* | (2006.01) |

(52) U.S. Cl.
CPC ............ *C09J 181/02* (2013.01); *C08G 59/66* (2013.01); *C08L 63/00* (2013.01); *C08L 81/02* (2013.01); *C09J 11/04* (2013.01); *C09J 11/08* (2013.01)

(58) Field of Classification Search
None
See application file for complete search history.

(56) References Cited

U.S. PATENT DOCUMENTS

| | | | |
|---|---|---|---|
| 2,466,963 | A | 4/1949 | Patrick et al. |
| 3,615,972 | A | 10/1971 | Morehouse, Jr. et al. |
| 3,864,181 | A | 2/1975 | Wolinski et al. |
| 3,881,074 | A | 4/1975 | Massy et al. |
| 3,975,194 | A | 8/1976 | Farnand et al. |
| 4,006,273 | A | 2/1977 | Wolinski et al. |
| 4,044,176 | A | 8/1977 | Wolinski et al. |
| 4,366,307 | A | 12/1982 | Singh et al. |
| 4,582,756 | A | 4/1986 | Niinuma et al. |
| 4,609,762 | A | 9/1986 | Morris et al. |
| 4,722,943 | A | 2/1988 | Melber et al. |
| 4,787,451 | A | 11/1988 | Mitchell |
| 5,525,262 | A | 6/1996 | Castellucci et al. |
| 5,536,756 | A | 7/1996 | Kida et al. |
| 5,663,219 | A | 9/1997 | Chokshi et al. |
| 5,912,319 | A | 6/1999 | Zook et al. |
| 5,942,556 | A | 8/1999 | Friedlander et al. |
| 5,955,143 | A | 9/1999 | Wheatley et al. |
| 6,172,179 | B1 | 1/2001 | Zook et al. |
| 6,235,800 | B1 | 5/2001 | Kyuno et al. |
| 6,486,297 | B2 | 11/2002 | Zook et al. |
| 6,525,158 | B1 | 2/2003 | Hoffman |
| 6,525,168 | B2 | 2/2003 | Zook et al. |
| 6,613,436 | B2 | 9/2003 | Ambrose et al. |
| 6,875,800 | B2 | 4/2005 | Vanier et al. |
| 6,894,086 | B2 | 5/2005 | Munro et al. |
| 6,998,107 | B2 | 2/2006 | Unger |
| 7,009,032 | B2 | 3/2006 | Bojkova et al. |
| 7,097,883 | B2 | 8/2006 | Sawant et al. |
| 8,816,023 | B2 | 8/2014 | Anderson et al. |
| 8,993,691 | B2 | 3/2015 | Anderson et al. |
| 9,951,251 | B2 * | 4/2018 | Anderson ............ C09K 3/1012 |
| 2004/0097643 | A1 | 5/2004 | Bons et al. |
| 2004/0247792 | A1 | 12/2004 | Sawant et al. |
| 2005/0001003 | A1 | 1/2005 | Nayrac et al. |
| 2005/0270796 | A1 | 12/2005 | Ichikawa et al. |
| 2005/0287348 | A1 | 12/2005 | Faler et al. |
| 2006/0252881 | A1 | 11/2006 | DeSaw et al. |
| 2010/0286307 | A1 | 11/2010 | Anderson et al. |
| 2013/0345372 | A1 | 12/2013 | Blackford et al. |
| 2014/0110881 | A1 | 4/2014 | Keledjian et al. |
| 2016/0083619 | A1 * | 3/2016 | Anderson ............ C09K 3/1012 523/457 |

FOREIGN PATENT DOCUMENTS

| | | |
|---|---|---|
| RU | 2003117463 | 12/2004 |
| RU | 2263699 | 11/2005 |
| WO | 00/75221 | 12/2000 |
| WO | 01/07154 | 2/2001 |
| WO | 01/66622 | 9/2001 |
| WO | 01/66642 | 9/2001 |
| WO | 2006/060272 | 6/2006 |
| WO | 2007/063001 | 6/2007 |
| WO | 2008/040508 | 4/2008 |

OTHER PUBLICATIONS

Non-Final Office Action for U.S. Appl. No. 14/963,976, dated May 24, 2016, 9 pages.
Final Office Action for U.S. Appl. No. 14/963,976, dated Nov. 2, 2016, 8 pages.

* cited by examiner

*Primary Examiner* — Ana L. Woodward
(74) *Attorney, Agent, or Firm* — William R. Lambert

(57) ABSTRACT

Low density aerospace compositions and sealants are disclosed. The low density compositions and sealants are characterized by a high volume percent loading of low density microcapsules.

21 Claims, No Drawings

LOW DENSITY AEROSPACE COMPOSITIONS AND SEALANTS

FIELD

The present disclosure relates to low density compositions and sealants. The compositions and sealants are characterized by a high volume percent loading of low density microcapsules.

BACKGROUND

Aerospace sealants must satisfy demanding mechanical, chemical, and environmental requirements. The sealants can be applied to a variety of surfaces including metal surfaces, primer coatings, intermediate coatings, finished coatings, and aged coatings. Sealants comprising sulfur-containing prepolymers that exhibit acceptable fuel resistance, thermal resistance, and flexibility for aerospace applications are described, for example, in U.S. Pat. No. 6,172,179. In sealants such as those described in U.S. Application Publication Nos. 2006/0270796, 2007/0287810, and 2009/0326167, a sulfur-containing polymer such as a thiol-terminated polythioether prepolymer can be reacted with a polyepoxide curing agent in the presence of an amine catalyst to provide a cured product. These systems are useful as sealants and can meet the demanding performance requirements of the aerospace industry including fuel resistance. Cured aerospace sealants must exhibit acceptable tensile strength, elongation, and adhesion to a variety of aerospace substrates and must maintain these properties following exposure to aviation fluids.

Reducing the weight of aerospace components including coatings and sealants can significantly increase fuel economy. To reduce the weight of aerospace vehicles low density filler can be added to a coating composition. Coatings and sealants having a specific gravity of about 1 are commercially available. To further reduce the weight of aerospace vehicles it is desirable that coatings and sealants have a specific gravity less than 1.

U.S. Pat. Nos. 8,816,023 and 8,993,691, each of which is incorporated by reference in its entirety, disclose low density aerospace sealant compositions characterized by a specific gravity of about 1. These compositions include low density filler formed from thermally expandable thermoplastic microcapsules that have an exterior coating of an aminoplast resin functionalized with a polythiol. Cured compositions comprising the thiol-functionalized coated microcapsules exhibited superior solvent resistance as determined by percentage swell measurements following immersion in methyl ethyl ketone or in Jet Reference Fuel (JRF) Type I for 7 days at 140° F. (60° C.) compared to lightweight sealants made using thermally expandable thermoplastic microcapsules without the polythiol-functionalized aminoplast resin coating. Other important properties such as tensile strength, elongation, and adhesion following immersion in JRF Type I and/or NaCl were not evaluated. The sealant compositions disclosed in U.S. Pat. Nos. 8,816,023 and 8,993,691 were limited to compositions having a specific gravity of about 1 and a loading of low density microcapsules of about 30 vol %, where vol % is based on the total volume of the sealant composition or about 2 wt % where wt % is based on the total weight of the composition.

Increasing the loading of light weight fillers can reduce the properties of a cured sealant. For example, the cohesion strength of a sealant is primarily imparted by the resins, and as the vol % of a filler increases, for example, to 50 vol % of the composition, there is less resin available to support the physical properties of the cured sealant. Also, with increasing filler content, the interface between the filler particles and the binder increases and can provide additional failure sites. The binder and additives must impart sufficient integrity for the sealant to adhere to both the surface of the substrate and to the incorporated filler particles.

Therefore, it is desirable to provide low density sealants having a specific gravity less than 0.9 that meet aerospace sealant performance requirements.

SUMMARY

According to the present invention, a composition comprises: from 50 wt % to 70 wt % of a thiol-terminated polythioether prepolymer; from 15 wt % to 21 wt % of a polyepoxide; and from 35 vol % to 55 vol % of a low density filler, wherein the low density filler is characterized by a specific gravity less than 0.1, and the low density filler comprises low density microcapsules comprising a coating of an aminoplast resin; wherein wt % is based on the total weight of the composition, and vol % is based on the total volume of the composition, and wherein the composition is characterized by a specific gravity less than 0.9, wherein the specific gravity is determined according to ASTM D1475 (modified).

According the present invention, a cured sealant is prepared using a composition according to the present invention.

According the present invention, a part comprises a cured sealant according to the present invention.

According the present invention, a method of sealing a part, comprises: applying a composition according to the present invention to at least one surface of a part; and curing the applied composition to seal the part.

According the present invention, a sealant system comprises a first component and a second component, wherein, the first component comprises: from 50 wt % to 70 wt % of a thiol-terminated polythioether; from 2.5 wt % to 4.0 wt % of a low density filler, wherein the low density filler is characterized by a specific gravity within a range from 0.01 to 0.09, and the low density filler comprises low density microcapsules comprising a coating of an aminoplast resin, wherein the specific gravity is determined according to ASTM D1475, wherein wt % is based on the total weight of the first component; and the second component comprises: from 75 wt % to 95 wt % of a polyepoxide, wherein wt % is based on the total weight of the second component, wherein the first component and the second component combined provide the composition according to the present invention.

According the present invention, a cured sealant is prepared using a system according to the present invention.

According the present invention, a part comprises a cured sealant prepared using a system according the present invention.

According the present invention, method of sealing a part, comprises: combining the first component and the second component of a sealant system according to the present invention to provide a curable sealant composition; applying the curable sealant composition to at least one surface of a part; and curing the applied curable sealant composition to seal the part.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —CONH$_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, and dodecane-1,12-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, and cyclohexane-1,2-diyl.

A "curable composition" refers to a composition that comprises at least two reactants capable of reacting to form a cured composition. For example, a curable composition can comprise a thiol-terminated polythioether prepolymer and a polyepoxide capable of reacting to form a cured polymer. A curable composition may include a catalyst for the curing reaction and other components such as, for example, fillers, pigments, solvents, plasticizers, and adhesion promoters. A curable composition may be curable at ambient conditions such as room temperature and humidity, or may require exposure to elevated temperature, moisture, or other condition(s) to initiate and/or to accelerate the curing reaction. A curable composition may initially be provided as a two-part composition including a separate base component and a separate accelerator component. The base composition can contain one of the reactants participating in the curing reaction such as a thiol-terminated polythioether prepolymer and the accelerator composition can contain the other reactant such as a polyepoxide. Other additives can be included in the base and/or accelerator compositions. The two compositions can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise. A Class B sealant composition, which is suitable for fillet seal applications, can be characterized by a viscosity from 4,500 poise to 20,000 poise. A Class C sealant composition, which is suitable for fay seal applications, can be characterized by a viscosity from 500 poise to 4,500 poise. After the two components of a sealant system are combined and mixed, the curing reaction can proceed and the viscosity of the curable composition can increase and at some point will no longer be workable. The duration between the time the two components are mixed to form the curable composition and the time the curable composition can no longer be reasonably or practically applied to a surface for its intended purpose and method of application can be referred to as the working time. As can be appreciated, the working time can depend on a number of factors including, for example, the curing chemistry, the application method, and the temperature. Once a curable composition is applied to a surface (and during application), the curing reaction can proceed to provide a cured composition. A cured composition develops a tack-free surfaces and fully cures over a period of time. A curable composition can be considered to be cured when the surface is tack-free, or can be considered cured, for example, when the Shore A hardness of the surface is 25 A for a Class C sealant and 30 A for a Class B sealant.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by end group analysis using iodine titration.

"Prepolymers" refer to polymers prior to curing. In general, prepolymers provided by the present disclosure are liquid at room temperature. "Adducts" refer to prepolymers that are functionalized with a reactive terminal group; however, prepolymers may also contain terminal functional groups. Thus, the terms prepolymer and adduct are used interchangeably. The term adduct is often used to refer to a prepolymer that is an intermediate in a reaction sequence used to prepare a prepolymer.

Specific gravity refers to the ratio of the density of a substance to the density of water at room temperature and pressure. Specific gravity can be measured according to ASTM D1475. The specific gravity of low density filler such as microcapsules was measured according to ASTM D1475. The specific gravity of the composition and sealants was determined according to ASTM D1473 modified to weigh the sealant in hexane.

Reference is now made to certain embodiments of compositions and methods. The disclosed embodiments are not intended to be limiting of the claims. To the contrary, the claims are intended to cover all alternatives, modifications, and equivalents.

Compositions provided by the present disclosure can comprise a thiol-terminated polythioether prepolymer, a polyepoxide, and low density microcapsules. A composition can be formulated as a sealant, such as an aerospace sealant.

Compositions and sealant formulations provided by the present disclosure can comprise a thiol-terminated polythioether prepolymer or combination of thiol-terminated polythioether prepolymers.

Examples of suitable thiol-terminated polythioether prepolymers are disclosed in U.S. Pat. No. 6,172,179, which is incorporated by reference in its entirety.

A thiol-terminated polythioether prepolymer can comprise a thiol-terminated polythioether prepolymer comprising the chemical structure of Formula (1):

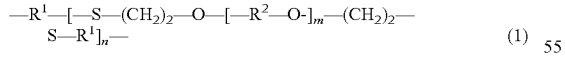
(1)

wherein,
each $R^1$ can independently comprise a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, or a —[(—$CHR^3$—)$_p$—X—]$_q$—($CHR^3$)$_r$— group, wherein each $R^3$ can comprise from hydrogen or methyl;
each $R^2$ can independently comprise a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, or a —[(—$CH_2$-)$_p$—X—]$_q$—($CH_2$)$_r$— group;

each X can independently comprise —O—, —S—, and —NR—, wherein R can comprise from hydrogen or methyl;
m ranges from 0 to 50;
n is an integer ranging from 1 to 60;
p is an integer ranging from 2 to 6;
q is an integer ranging from 1 to 5; and
r is an integer ranging from 2 to 10.

In prepolymers of Formula (1), $R^1$ can be —[—($CHR^3$)$_p$—X—]$_q$—($CHR^3$)$_r$— wherein each X can independently comprise from —O— and —S—. In prepolymers of Formula (1), $R^1$ can be —[—($CHR^3$)$_p$—X—]$_q$—($CHR^3$)$_r$—, each X can be —O— or each X can be —S—.

In prepolymers of Formula (1), $R^1$ can be —[—($CH_2$)$_p$—X—]$_q$—($CH_2$)$_r$— wherein each X can independently comprise from —O— and —S—. In prepolymers of Formula (1), $R^1$ can be —[—($CH_2$)$_p$—X—]$_q$—($CH_2$)$_r$—, each X can be —O— or each X can be —S—.

In prepolymers of Formula (1), $R^1$ can be —[(—$CH_2$-)$_p$—X—]$_q$—($CH_2$)$_r$—, where p can be 2, X can be O, q can be 2, r can be 2, $R^2$ can be ethanediyl, m can be 2, and n can be 9.

In prepolymers of Formula (1), each $R^1$ can be derived from dimercaptodioxaoctane (DMDO) or each $R^1$ can be derived from dimercaptodiethylsulfide (DMDS).

In prepolymers of Formula (1), each m can be independently an integer from 1 to 3. Each m can be the same and can be 1, 2, or 3.

In prepolymers of Formula (1), n can be an integer from 1 to 30, an integer from 1 to 20, an integer from 1 to 10, or an integer from 1 to 5. In addition, n may be any integer from 1 to 60.

In prepolymers of Formula (1), each p can independently comprise 2, 3, 4, 5, or 6. Each p can be the same and is 2, 3, 4, 5, or 6.

A thiol-terminated polythioether prepolymer can comprise Permapol® P3.1e, available from PRC-DeSoto International Inc.

A thiol-terminated polythioether prepolymer can comprise a thiol-terminated polythioether prepolymer of Formula (2a), a thiol-terminated polythioether prepolymer of Formula (2b), or a combination thereof:

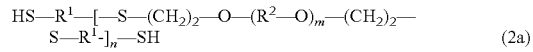
(2a)

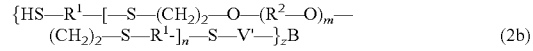
(2b)

wherein,
each $R^1$ can independently comprise from $C_{2-10}$ alkanediyl, $C_{6-8}$ cycloalkanediyl, $C_{6-14}$ alkanecycloalkanediyl, $C_{5-8}$ heterocycloalkanediyl, or —[(—$CHR^3$—)$_p$—X—]$_q$—(—$CHR^3$—)$_r$—, wherein,
p is an integer from 2 to 6;
q is an integer from 1 to 5;
r is an integer from 2 to 10;
each $R^3$ can independently comprise hydrogen or methyl; and
each X can independently comprise —O—, —S—, or —NR—, wherein R can comprise hydrogen or methyl;
each $R^2$ can independently comprise $C_{1-10}$ alkanediyl, $C_{6-8}$ cycloalkanediyl, $C_{6-14}$ alkanecycloalkanediyl, or —[(—$CHR^3$—)$_p$—X—]$_q$—(—$CHR^3$—)$_r$—, wherein p, q, r, $R^3$, and X are as defined as for $R^1$;
m is an integer from 0 to 50;
n is an integer from 1 to 60;

B represents a core of a z-valent, polyfunctionalizing agent B(—V)$_z$ wherein, z is an integer from 3 to 6; and each V is a moiety comprising a terminal group reactive with a thiol; and each —V'— is derived from the reaction of —V with a thiol.

In prepolymers of Formula (2a) and Formula (2b), R$^1$ can be —[(—CH$_2$-)$_p$—X—]$_q$—(CH$_2$)$_r$—, where p can be 2, X can be —O—, q can be 2, r can be 2, R$^2$ can be ethanediyl, m can be 2, and n can be 9.

In prepolymers of Formula (2a) and Formula (2b), R$^1$ can comprise C$_{2-6}$ alkanediyl or —[—(CHR$^3$)$_p$—X—]$_q$—(CHR$^3$)$_r$—.

In prepolymers of Formula (2a) and Formula (2b), R$^1$ can comprise —[—(CHR$^3$)$_p$—X—]$_q$—(CHR$^3$)$_r$—, X can be —O— or X can be —S—.

In prepolymers of Formula (2a) and Formula (2b), where R$^1$ can comprise —[—(CHR$^3$)$_p$—X—]$_q$—(CHR$^3$)$_r$—, p can be 2, r can be 2, q can be 1, and X can be —S—; or wherein p can be 2, q can be 2, r can be 2, and X can be —O—; or p can be 2, r can be 2, q can be 1, and X can be —O—.

In prepolymers of Formula (2a) and Formula (2b), where R$^1$ can comprise —[—(CHR$^3$)$_p$—X—]$_q$—(CHR$^3$)$_r$—, each R$^3$ can comprise hydrogen, or at least one R$^3$ can comprise methyl.

In prepolymers of Formula (2a) and Formula (2b), each R$^1$ can be the same, or at least one R$^1$ can be different.

Various methods can be used to prepare thiol-terminated polythioether prepolymers of Formula (2a) and Formula (2b). Such thiol-terminated polythioether prepolymers may be difunctional, that is, linear polymers having two terminal thiol groups, or polyfunctional, that is, branched polymers have three or more terminal thiol groups. Suitable thiol-terminated polythioether prepolymers are commercially available, for example, as Permapol® P3.1e, from PRC-DeSoto International Inc.

A thiol-terminated polythioether prepolymer can be a combination of Permapol® P3.1e prepolymers having different thiol functionalities.

A thiol-terminated polythioether prepolymer may comprise a mixture of different thiol-terminated polythioethers and the thiol-terminated polythioethers may have the same or different functionality. A thiol-terminated polythioether prepolymer has an average functionality from 2 to 6, from 2 to 4, from 2 to 3, from 2.05 to 2.8, or from 2.05 to 2.5. For example, a thiol-terminated polythioether prepolymer can comprise a difunctional thiol-terminated polythioether, a trifunctional thiol-terminated polythioether or a combination thereof.

A thiol-terminated polythioether prepolymer can be prepared by reacting a polythiol and a diene such as a divinyl ether, and the respective amounts of the reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as a divinyl ether. A thiol-terminated polyfunctionalizing agent is present in the reaction mixture in an amount sufficient to provide a thiol-terminated polythioether having an average functionality of from 2.05 to 3, such as from 2.1 to 2.8, or from 2.1 to 2.6.

The reaction used to make a thiol-terminated polythioether prepolymer may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioether prepolymers may be produced by reacting a divinyl ether or mixtures of divinyl ethers with an excess of dithiol or a mixtures of dithiols.

Thus, a thiol-terminated polythioether prepolymer can comprise the reaction product of reactants comprising:

(a) a dithiol of Formula (3):

HS—R$^1$—SH  (3)

wherein,

R$^1$ can comprise C$_{2-6}$ alkanediyl, C$_{6-8}$ cycloalkanediyl, C$_{6-10}$ alkanecycloalkanediyl, C$_{5-8}$ heterocycloalkanediyl, or —[—(CHR$^3$)$_p$—X—]$_q$—(CHR$^3$)$_r$—;

wherein, each R$^3$ can independently comprise hydrogen or methyl;

each X can independently comprise —O—, —S—, —NH—, or —N(—CH$_3$)—;

p is an integer from 2 to 6;

q is an integer from 1 to 5; and r is an integer from 2 to 10; and (b) a divinyl ether of Formula (4):

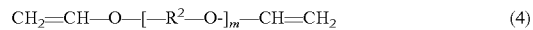

CH$_2$=CH—O—[—R$^2$—O-]$_m$—CH=CH$_2$  (4)

wherein, each R$^2$ can independently comprise C$_{1-10}$ alkanediyl, C$_{6-8}$ cycloalkanediyl, C$_{6-14}$ alkanecycloalkanediyl, or —[(—CHR$^3$—)$_p$—X—]$_q$—(—CHR$^3$—)$_r$—, wherein p, q, r, R$^3$, and X are as defined above; and m is an integer from 0 to 50.

The reactants may further comprise (c) a polyfunctional compound such as a polyfunctional compound B(—V)$_z$, where B, —V, and z are as defined herein.

Dithiols suitable for use in preparing thiol-terminated polythioether prepolymers include those having the structure of Formula (3):

HS—R$^1$—SH  (3)

wherein,

R$^1$ can comprise C$_{2-6}$ alkanediyl, C$_{6-8}$ cycloalkanediyl, C$_{6-10}$ alkanecycloalkanediyl, C$_{5-8}$ heterocycloalkanediyl, or —[—(CHR$^3$)$_p$—X—]$_q$—(CHR$^3$)$_r$—;

wherein, each R$^3$ can independently comprise hydrogen or methyl;

each X can independently comprise —O—, —S—, or —NR— wherein R can comprise hydrogen or methyl;

p is an integer from 2 to 6;

q is an integer from 1 to 5; and r is an integer from 2 to 10.

In dithiols of Formula (3), R$^1$ is —[—(CHR$^3$)$_p$—X—]$_q$—(CHR$^3$)$_r$—.

In dithiols of Formula (3), X can comprise —O— or —S—, and thus —[—(CHR$^3$)$_p$—X—]$_q$—(CHR$^3$)$_r$— in Formula (3) can be —[(—CHR$^3$—)$_p$—O—]$_q$—(CHR$^3$)$_r$— or —[(—CHR$^3_2$—)$_p$—S—]$_q$—(CHR$^3$)$_r$—. P and r can be equal, such as where p and r can be both two.

In dithiols of Formula (3), $R^1$ can comprise $C_{2-6}$ alkanediyl and $—[—(CHR^3)_p—X—]_q—(CHR^3)_r—$.

In dithiols of Formula (3), $R^1$ can comprise $—[—(CHR^3)_p—X—]_q—(CHR^3)_r—$, and X can be —O—, or X can be —S—.

In dithiols of Formula (3) where $R^1$ can comprise $—[—(CHR^3)_p—X—]_q—(CHR^3)_r—$, p can be 2, r can be 2, q can be 1, and X can be —S—; or p can be 2, q can be 2, r can be 2, and X can be —O—; or p can be 2, r can be 2, q can be 1, and X can be —O—.

In dithiols of Formula (3) where $R^1$ can comprise $—[—(CHR^3)_p—X—]_q—(CHR^3)_r—$, each $R^3$ can be hydrogen, or at least one $R^3$ can be methyl.

In dithiols of Formula (3), each $R^1$ can comprise derived from dimercaptodioxaoctane (DMDO) or each $R^1$ can be derived from dimercaptodiethylsulfide (DMDS).

In dithiols of Formula (3), each m can be independently an integer from 1 to 3. Each m can be the same and is 1, 2, or 3.

In dithiols of Formula (3), n can be an integer from 1 to 30, an integer from 1 to 20, an integer from 1 to 10, o an integer from 1 to 5. N may be any integer from 1 to 60.

In dithiols of Formula (3), each p can independently comprise 2, 3, 4, 5, and 6. Each p can be the same and can be 2, 3, 4, 5, or 6.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a lower (e.g., $C_{1-6}$) alkyl group, a lower alkoxy group, or a hydroxy group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is $—[(—CH_2—)_p—X—]_q—(CH_2)_r—$, wherein p is 2, r is 2, q is 1, and X is —S—); dimercaptodioxaoctane (DMDO) (in Formula (3), $R^1$ is $—[(—CH_2—)_p—X—]_q—(CH_2)_r—$, wherein p is 2, q is 2, r is 2, and X is —O—); and 1,5-dimercapto-3-oxapentane (in Formula (3), $R^1$ is $—[(—CH_2—)_p—X—]_q—(CH_2)_r—$, wherein p is 2, r is 2, q is 1, and X is —O—). It is also possible to use dithiols that include both heteroatoms in the carbon backbone and pendent alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing thiol-terminated polythioethers include, for example, divinyl ethers of Formula (4):

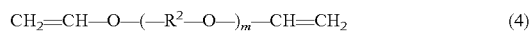

(4)

where $R^2$ in Formula (4) can comprise a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and $—[(—CH_2—)_p—O—]_q—(—CH_2—)_r—$, where p can be an integer ranging from 2 to 6, q can be an integer from 1 to 5, and r can be an integer from 2 to 10. In a divinyl ether of Formula (4), $R^2$ can be a $C_{2-6}$ n-alkanediyl group, a $C_{3-6}$ branched alkanediyl group, a $C_{6-8}$ cycloalkanediyl group, a $C_{6-10}$ alkanecycloalkanediyl group, or $—[(—CH_2—)_p—O—]_q—(—CH_2—)_r—$.

Suitable divinyl ethers include, for example, compounds having at least one oxyalkanediyl group, such as from 1 to 4 oxyalkanediyl groups, i.e., compounds in which m in Formula (4) can be an integer ranging from 1 to 4. In divinyl ethers of Formula (4) m can be an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) ($R^2$ in Formula (4) can be ethanediyl and m is 1), butanediol divinyl ether (BD-DVE) ($R^2$ in Formula (4) can be butanediyl and m is 1), hexanediol divinyl ether (HD-DVE) ($R^2$ in Formula (4) can be hexanediyl and m is 1), diethylene glycol divinyl ether (DEG-DVE) ($R^2$ in Formula (4) can be ethanediyl and m is 2), triethylene glycol divinyl ether ($R^2$ in Formula (4) can be ethanediyl and m is 3), tetraethylene glycol divinyl ether ($R^2$ in Formula (4) can be ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups comprising alkyl groups, hydroxy groups, alkoxy groups, or amine groups.

Divinyl ethers in which $R^2$ in Formula (4) is $C_{3-6}$ branched alkanediyl may be prepared by reacting a polyhydroxy compound with acetylene. Examples of divinyl ethers of this type include compounds in which $R^2$ in Formula (4) is an alkyl-substituted methanediyl group such as —CH(—CH$_3$)—, for which $R^2$ in Formula (4) is ethanediyl and m is 3 or an alkyl-substituted ethanediyl.

Other useful divinyl ethers include compounds in which $R^2$ in Formula (4) is polytetrahydrofuryl (poly-THF) or polyoxyalkanediyl, such as those having an average of about 3 monomer units.

Two or more types of polyvinyl ether monomers of Formula (4) may be used. Thus, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

A polyvinyl ether monomer can comprise 20 mole percent to less than 50 mole percent of the reactants used to prepare a thiol-terminated polythioether, or 30 mole percent to less than 50 mole percent.

Relative amounts of dithiols and divinyl ethers can be selected to yield polythioethers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to alkenyl groups is greater than 1:1, such as from 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain reactions, the catalyst does not comprise acidic or basic compounds, and does not produce acidic or basic compounds upon decomposition. Examples of suitable free-radical catalysts include azo-type catalysts, such as VAZO®-57 (Du Pont), VAZO®-64 (Du Pont), VAZO®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioether prepolymers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as 2 hours to 6 hours.

Thiol-terminated polythioether prepolymers may comprise a polyfunctional polythioether prepolymer, i.e., may have an average functionality of greater than 2.0. Suitable polyfunctional thiol-terminated polythioethers include, for example, those having the structure of Formula (2b):

{HS—R$^1$—[—S—(CH$_2$)$_2$—O—(R$^2$—O)$_m$—(CH$_2$)$_2$—S—R$^1$-]$_n$—S—V'-}$_z$B     (2b)

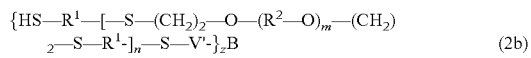

where z has an average value of greater than 2.0, and, a value between 2 and 3, a value between 2 and 4, a value between 3 and 6, or can be an integer from 3 to 6.

Polyfunctionalizing agents suitable for use in preparing such polyfunctional thiol-terminated polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133, which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

In thiol-terminated polythioether prepolymers of Formula (2a) and Formula (2b) the prepolymers can be the reaction product of DMDO, diethylene glycol divinyl ether, and triallyl cyanurate (TAC), wherein R$^1$ is —[(—CH$_2$—)$_p$—X—]$_q$—(CH$_2$)$_r$—, wherein p is 2, q is 2, r is 2, and X is —O—; R$^2$ is —(CH$_2$)$_2$— and m is 2; and B(—V)$_z$ has the structure of Formula (5):

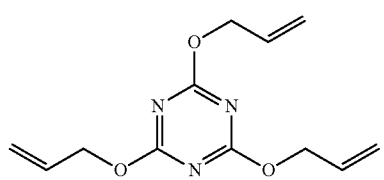

(5)

A thiol-terminated polythioether prepolymer can be a combination of thiol-terminated polythioethers having different thiol functionalities. For example, a thiol terminated polythioether can be a combination of thiol-terminated polythioethers having a functionality of 2.2 and a functionality of 2.8. A thiol-terminated polythioether can comprise from 95 wt % to 99.5 wt % of a thiol-terminated polythioether having a thiol functionality of 2.2 and from 0.5 wt % to 5 wt % of a thiol-terminated polythioether having a functionality of 2.8, where wt % is based on the total weight of the thiol-terminated polythioether.

Compositions and sealants provided by the present disclosure can comprise a curing agent, i.e., crosslinking agent, comprising a compound reactive with thiol groups. Examples of suitable curing agents include polyepoxides, Michael acceptors, and polyalkenyls. Suitable curing agents can comprise two or more groups reactive with thiol groups.

Compositions and sealants provided by the present disclosure can comprise a polyepoxide curing agent or a combination of polyepoxide curing agents. A polyepoxide refers to a compound having two or more reactive epoxy groups. A polyepoxide can be difunctional or can include a combination of polyepoxides having different epoxy functionalities. A polyepoxide may include a combination of polyepoxides. A polyepoxide resin can be liquid at room temperature.

Examples of suitable polyepoxide curing agents include hydantoin diepoxide, a diglycidyl ether of bisphenol-A, a diglycidyl ether of bisphenol-F, a novolac-type polyepoxide, epoxidized unsaturated phenolic resins, dimer acid-based epoxy resins, and combinations of any of the foregoing.

Sealant compositions provided by the present disclosure can include a stoichiometric excess of the curing agent compared to the thiol-terminated polythioether. For example, a sealant composition may contain from 1.1 to 1.3 epoxy equivalents to 1 thiol equivalent or from 1.15 to 1.25 epoxy equivalents to 1 thiol equivalent.

Other examples of suitable polyepoxides include a bisphenol A type polyepoxide, a brominated bisphenol A type polyepoxide, a bisphenol F type polyepoxide, a biphenyl type polyepoxide, a novolac type polyepoxide, an alicyclic polyepoxide, a naphthalene type polyepoxide, an ether or polyether polyepoxide, an oxirane ring-containing polybutadiene, and a silicone polyepoxy copolymer.

Additional examples of suitable polyepoxides include a bisphenol A type polyepoxide having an average molecular weight, for example of 400 Daltons or less 600 Daltons or less, 1,000 Daltons or less, 1,200 Daltons or less, or 1,400 Daltons or less; a branched polyfunctional bisphenol A type polyepoxide such as p-glycidyloxyphenyl dimethyltolylbisphenol A diglycidyl ether; a bisphenol F type epoxy resin; a phenol novolac type polyepoxide having an average molecular weight, for example, of 500 Daltons or less, 700 Daltons or less, 1,000 Daltons or less, or 1,500 Daltons or less; an alicyclic polyepoxide such as vinyl(3,4-cyclohexene)dioxide, methyl 3,4-epoxycyclohexylcarboxylate (3,4-epoxycyclohexyl), bis(3,4-epoxy-6-methylcyclohexylmethyl) adipate and 2-(3,4-epoxycyclohexyl)-5,1-spiro(3,4-epoxycyclohexyl)-m-dioxane; a biphenyl type polyepoxide such as 3,3',5,5,5'-tetramethyl-4,4'-diglycidyloxybiphenyl; a glycidyl ester type polyepoxide such as diglycidyl hexahydrophthalate, diglycidyl 3-methylhexahydrophthalate and diglycidyl hexahydroterephthalate; a glycidylamine type polyepoxide such as diglycidylaniline, diglycidyltoluidine, triglycidyl-p-aminophenol, tetraglycidyl-m-xylene diamine, tetraglycidylbis(aminomethyl)cyclohexane; a hydantoin type polyepoxide such as 1,3-diglycidyl-5-methyl-5-ethyl-hydantoin; and a naphthalene ring-containing polyepoxide. Also, a polyepoxide having silicone such as 1,3-bis(3-glycidoxy-propyl)-1,1,3,3-tetramethyldisiloxane may be used.

Examples of commercially available polyepoxides suitable for use in compositions and sealants provided by the present disclosure include polyglycidyl derivatives of phenolic compounds, such as those available under the trade names EPON™ 824, EPON™ 825, EPON™ 826, EPON™ 827, EPON™ 828, EPON™ 829, EPON™ 830, EPON™ 834, EPON™ 862, EPON™ 863, EPON™ 8280, EPON™ 8281, EPON™872, an EPON™ resin blend, EPON™ 1001-A-80, EPON™ 1001-B-80, EPON™ 1001-CX-75, EPON™ 1001-DNT-75, EPON™ 1001-FT-75, EPON™ 1001-G-70, EPON™ 1001-H-75, EPON™ 1001-K-65, EPON™ 1001-O-75, EPON™ 1001-T-75, EPON™ 1001-UV-70, EPON™ 1001-X-75, EPON™ 1004-O-65, EPON™ 1007-CT-55, EPON™ 1007-FMU-50, EPON™ 1007-HT-55, EPON™ 1009-DU-40, EPON™ 1009-MX-40, and other EPON™ epoxy resins, available, for example, from Momentive Specialty Chemicals Inc. and/or from Resolution Performance Products LLC; and DER™ 331, DER™ 332, DER™ 334, DER™ 354, DER™ 383 and DER™ 542 from Dow Chemical Co. Other suitable polyepoxides include polyepoxides prepared from polyols and polyglycidyl derivatives of phenol-formaldehyde novolacs, the latter of which are commercially available under the trade names DEN™ 431, DEN™ 438, and DEN™ 439 from Dow Chemical Company. Cresol analogs are also available commercially ECN™ 1235, ECN™ 1273, and ECN™ 1299 from Ciba Specialty Chemicals, Inc. SU-8 is a bisphenol A-type epoxy Novolac available from Resolution Performance Products LLC. Polyglycidyl adducts of amines, amninoalcohols and polycarboxylic acids are also useful in this invention, commercially available resins of which include GLYAMINE™ 135, GLYAMINE™ 125, and GLYAMINE™ 115; ARALDITE™ MY-720, ARALDITE™ MY-721, ARALDITE™ 0500, and ARALDITE™ 0510 from Ciba Specialty Chemicals, Inc. and PGA-X and PGA-C.

Compositions can comprise, for example, from 10 wt % to 30 wt % of a polyepoxide, from 12 wt % to 28 wt %, from 14 wt % to 26 wt %, from 16 wt % to 24 wt %, or from 18 wt % to 22 wt % of a polyepoxide, wherein wt % is based on the total weight of the composition.

A polyepoxide can include a combination of polyepoxides.

A polyepoxide can comprise, for example, at least 85 wt % of a diglycidyl ether of bisphenol A, such as at least 90 wt %, or at least 95 wt %, wherein wt % is based on the total weight of the polyepoxide in a composition.

A polyepoxide can comprise, for example, from 85 wt % to 99 wt % of a diglycidyl ether of bisphenol A, from 87 wt % to 97 wt %, from 89 wt % to 95 wt %, or from 91 wt % to 93 wt %, where wt % is based on the total weight of the polyepoxide in a composition.

A polyepoxide can comprise, for example, from 1 wt % to 11 wt % of a novolac polyepoxide, from 2 wt % to 9 wt %, or from 4 wt % to 7 wt % of a novolac polyepoxide, where wt % is based on the total weight of the polyepoxide in a composition.

A polyepoxide can comprise, for example, from 86 wt % to 99 wt % of a diglycidyl ether of bisphenol A and from 1 wt % to 11 wt % of a novolac polyepoxide; from 88 wt % to 97 wt % of a diglycidyl ether of bisphenol A and from 3 wt % to 9 wt % of a novolac polyepoxide; or from 90 wt % to 95 wt % of a diglycidyl ether of bisphenol A and from 5 wt % to 7 wt % of a novolac polyepoxide; wherein wt % is based on the total weight of the polyepoxide in a composition.

A polyepoxide can comprise a hydroxyl-functional polyepoxide or combination of hydroxyl-functional polyepoxides. For example, a polyepoxide can comprise a hydroxyl-functional diglycidyl ether of bisphenol A.

A diglycidyl ether of bisphenol A can comprise pendent hydroxyl groups such as, for example, from 1 to 10 pendent hydroxyl groups, from 1 to 8 hydroxyl groups, from 1 to 6 hydroxyl groups, from 1 to 4 pendent hydroxyl groups, or from 1 to 2 pendent hydroxyl groups, such as 1, 2, 3, 4 5, or 6 pendent hydroxyl groups. A diglycidyl ether of bisphenol A having pendent hydroxyl groups can be referred to as hydroxyl-functional diglycidyl ether of bisphenol A.

Hydroxyl-functional diglycidyl ethers of bisphenol A can have an epoxy equivalent weight from 400 Daltons to 1,500 Daltons, from 400 Daltons to 1,000 Daltons or from 400 Daltons to 600 Daltons.

A diglycidyl ether of bisphenol A can comprise a diglycidyl ether of bisphenol A without a hydroxyl-functional component, a diglycidyl ether of bisphenol A which ci partly hydroxyl-functional, or all of the diglycidyl ether of bisphenol A can be hydroxyl-functional.

A diglycidyl ether of bisphenol A having hydroxyl pendent groups can have the structure:

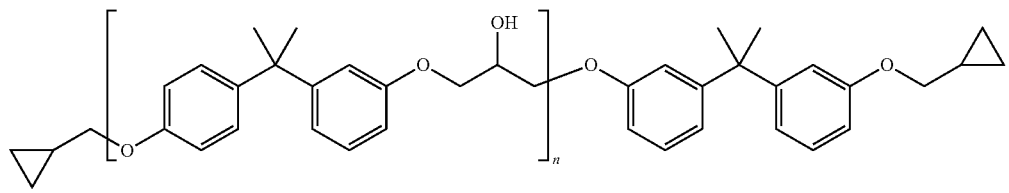

where n is an integer from 1 to 6, or n is within a range from 1 to 6.

Examples of suitable diglycidyl ethers of bisphenol A include bisphenol A polyepoxides in which n is an integer from 1 to 6, or a combination of bisphenol A polyepoxides in which n can be a non-integer value, for example, from 0.1 to 2.9, from 0.1 to 2.5, from 0.1 to 2.1, from 0.1 to 1.7, from 0.1 to 1.5, from 0.1 to 1.3, from 0.1 to 1.1, from 0.1 to 0.9, from 0.3 to 0.8, or from 0.5 to 0.8.

A diglycidyl ether of bisphenol A comprising hydroxyl pendent groups can comprise, for example, a 2,2-bis(p-glycidyloxyphenyl)propane condensation product with 2,2-bis(p-hydroxyphenyl)propane and similar isomers. Suitable diglycidyl ethers of bisphenol A comprising hydroxyl pendent groups are available, for example, from Momentive and include EPON™ solid epoxy resins such as EPON™ 1001F, EPON™ 1002F, EPON™ 1004F, EPON™ 1007F, EPON™ 1009F, and combinations of any of the foregoing. Such diglycidyl ethers of bisphenol A may be provided, for example, as a 70 wt % to 95 wt % solids solution in a suitable solvent such as methyl ethyl ketone. Such high solids content resins include, for example, EPON™ 1001-A-80, EPON™ 1001-B-80, EPON™ 1001-CX-75, EPON™ 1001-DNT-75, EPON™ 1001-FT-75, EPON™ 1001-G-70, EPON™ 1001-H-75, EPON™ 1001-K-65, EPON™ 1001-O-75, EPON™ 1001-T-75, EPON™ 1001-UY-70, EPON™ 1001-X-75, EPON™ 1004-O-65, EPON™ 1007-CT-55, EPON™ 1007-FMU-50, EPON™ 1007-HT-55, EPON™ 1001-DU-40, EPON™ 1009-MX-840, or a combination of any of the foregoing.

Examples of suitable epoxy novolac resins include novolac polyepoxides in which n is an integer from 1 to 6, from 1 to 4, or from 1 to 2; or in which n can be a non-integer value, for example, from 0.1 to 2.9, from 0.1 to 2.5, from 0.1 to 2.1, from 0.1 to 1.7, from 0.1 to 1.5, from 0.1 to 1.3, from 0.1 to 1.1, from 0.1 to 0.9, from 0.3 to 0.8, or from 0.5 to 0.8.

A polyepoxide can comprise, for example, a difunctional polyepoxide, a polyepoxide having an epoxy functionality greater than 2 such as from 3 to 6, or a combination thereof. A polyepoxide can have an average epoxy functionality, for example, from 2.1 to 3.5, from 2.2 to 3.4, from 2.6 to 3.2, or from 2.7 to 3.1.

A polyepoxide can comprise, for example, a combination of a difunctional polyepoxide or combination of difunctional polyepoxides, a trifunctional polyepoxide or combination of trifunctional polyepoxides, or a combination of any of the foregoing.

Compositions provided by the present disclosure can comprise, for example, from 86 wt % to 99 wt % of a difunctional polyepoxide and from 1 wt % to 11 wt % of a trifunctional polyepoxide; from 88 wt % to 97 wt % of a difunctional polyepoxide and from 3 wt % to 9 wt % of a trifunctional polyepoxide; or from 90 wt % to 95 wt % of a difunctional polyepoxide and from 5 wt % to 7 wt % of a trifunctional polyepoxide; wherein wt % is based on the total weight of the polyepoxide in a composition.

A difunctional polyepoxide can have an epoxy equivalent weight, for example, from 400 Daltons to 1,500 Daltons, from 400 Daltons to 1,000 Daltons, or from 400 Daltons to 600 Daltons.

A trifunctional polyepoxide can have an epoxy equivalent weight, for example, from 140 Daltons to 500 Daltons, from 150 Daltons to 300 Daltons, or from 160 Daltons to 200 Daltons.

A difunctional polyepoxide can comprise, for example, a hydroxyl-functional polyepoxide and a trifunctional polyepoxide can comprise a hydroxyl-functional polyepoxide.

A composition can comprise, for example, a hydroxyl-functional polyepoxide and a trifunctional polyepoxide that does not contain pendent hydroxyl groups; or a composition can comprise a difunctional polyepoxide that does not contain pendent hydroxyl groups, and a hydroxyl-functional trifunctional polyepoxide.

Compositions provided by the present disclosure can comprise, for example, from 86 wt % to 99 wt % of a hydroxyl-functional difunctional polyepoxide and from 1 wt % to 11 wt % of a trifunctional polyepoxide; from 88 wt % to 97 wt % of a hydroxyl-functional difunctional polyepoxide and from 3 wt % to 9 wt % of a trifunctional polyepoxide; or from 90 wt % to 95 wt % of a hydroxyl-functional difunctional polyepoxide and from 5 wt % to 7 wt % of a trifunctional polyepoxide; where wt % is based on the total weight of the polyepoxide in a composition.

Compositions provided by the present disclosure can comprise, for example, from 86 wt % to 99 wt % of a hydroxyl-functional polyepoxide and from 1 wt % to 11 wt % of a non-hydroxyl-functional polyepoxide; from 88 wt % to 97 wt % of a hydroxyl-functional polyepoxide and from 3 wt % to 9 wt % of a non-hydroxyl-functional polyepoxide; or from 90 wt % to 95 wt % of a hydroxyl-functional polyepoxide and from 5 wt % to 7 wt % of a non-hydroxyl-functional polyepoxide; where wt % is based on the total weight of the polyepoxide in a composition.

A polyepoxide suitable for use in compositions provided by the present disclosure can comprise, for example, from 2 wt % to 10 wt % of a polyepoxide having an average epoxy functionality from 2.6 to 3.2, from 3 wt % to 9 wt %, from 4 wt % to 8 wt %, from 5 wt % to 7 wt %, or 6 wt % of a polyepoxide having an average epoxy functionality from 2.6 to 3.0; and from 90 wt % to 98 wt % of a difunctional polyepoxide, from 91 wt % to 97 wt %, from 92 wt % to 96 wt %, from 93 wt % to 95 wt %, or 94 wt % of a difunctional polyepoxide, where wt % is based on the total weight of the polyepoxide in a composition.

A difunctional polyepoxide can comprise a hydroxyl-functional polyepoxide.

Compositions provided by the present disclosure can comprise a combination of polyepoxides. A combination of polyepoxides can comprise polyepoxides having different polyepoxides having different functionalities or different average functionalities. For example, a combination of polyepoxides can comprise a polyepoxide having an average epoxy functionality from 2.7 to 2.9 such as 2.8 and a polyepoxide having an epoxy functionality of 2. Polyepoxides having a higher average functionality can increase the cross-linking density of a cured polymer network, which can lead to increased tensile strength, but also can reduce the % elongation of a cured sealant. Polyepoxides having a low epoxy functionality such as around 2 can result in a cured composition that is more flexible. Because low density compositions have a high content of filler microcapsules, which tends to increase the tensile strength of a cured sealant, it can be desirable to use polyepoxides or combinations of polyepoxides having an epoxy functionality from 2 to 3, such as from 2 to 2.5, or from 2 to 2.3.

Compositions of the present disclosure can comprise at least one inorganic filler in addition to low density microcapsules. An inorganic filler can be included to provide mechanical reinforcement and to control the rheological properties of the sealant composition.

Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, and combinations of any of the foregoing.

Inorganic filler can comprise a combination precipitated calcium carbonate, hydrated alumina, fumed silica, calcium hydroxide, and carbon black. Inorganic filler can improve the tensile strength of a cured composition.

Compositions provided by the present disclosure can comprise, for example, from 3 wt % to 23 wt % of an inorganic filler or combination of inorganic fillers, from 5 wt % to 21 wt %, from 8 wt % to 18 wt %, from 10 wt % to 16 wt %, or from 11 wt % to 15 wt %, where wt % is based on the total weight of the composition.

Compositions and sealants provided by the present disclosure can include an adhesion promoter or combination of adhesion promoters.

Low density compositions provided by the present disclosure can comprise an adhesion promoter or combination of adhesion promoters. An adhesion promoter can include a phenolic adhesion promoter, a combination of phenolic adhesion promoters, an organo-functional silane, a combination of organo-functional silanes, or a combination of any of the foregoing. An organosilane can be an amine-functional silane.

Compositions and sealants provided by the present disclosure can comprise a phenolic adhesion promoter, an organosilane, or a combination thereof. A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes.

Phenolic adhesion promoters can comprise the reaction product of a condensation reaction of a phenolic resin with one or more thiol-terminated polysulfides. Phenolic adhesion promoters can be thiol-terminated.

Examples of phenolic resins include 2-(hydroxymethyl) phenol, (4-hydroxy-1,3-phenylene)dimethanol, (2-hydroxybenzene-1,3,4-triyl) trimethanol, 2-benzyl-6-(hydorxymethyl)phenol, (4-hydroxy-5-((2-hydroxy-5-(hydroxymethyl) cyclohexa-2,4-dien-1-yl)methyl)-1,3-phenylene) dimethanol, (4-hydroxy-5-((2-hydroxy-3,5-bis (hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Examples of suitable polysulfides include Thioplast® resins (AkzoNobel) such as Thioplast® G10, Thioplast® G112, Thioplast® G131, Thioplast® G1, Thioplast® G12, Thioplast® G21, Thioplast® G22, Thioplast® G44, and Thioplast® G4.

A thiol-terminated polysulfide can also comprise the reaction product of a dithiol and a Thioplast® resin. Examples of suitable dithiols include dimercaptodiethylsulfide, dimercaptodioxaoctane, 1,5-dimercapto-3-oxapentane, HS—$CH_2CH(CH_3)$—S—$CH_2CH_2$—SH, HS—$CH(CH_3)$ $CH_2$—S—$CH_2CH_2$—SH, HS—$CH_2CH(CH_3)$—S—$CHCH_3CH_2$—SH, and HS—$CH(CH_3)CH_2$—S—$CH_2CH$ $(CH_3)$—SH.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Compositions provided by the present disclosure can comprise an organo-functional adhesion promoter such as an organo-functional silane. An organo-functional silane can comprise hydrolysable groups bonded to a silicon atom and at least one organofunctional group. An organo-functional silane can have the structure R"—$(CH_2)_n$—$Si(-OR)_{3-n}R'_n$, where R" is an organofunctional group, n is 0, 1, or 2, and R is alkyl such as methyl or ethyl. Examples of organofunctional groups include epoxy, amino, methacryloxy, or sulfide groups. An organofunctional silane can be a dipodal silane having two or more silane groups, a functional dipodal silane, a non-functional dipodal silane or a combination of any of the foregoing. An organofunctional silane can be a combination of a monosilane and a dipodal silane.

Compositions provided by the present disclosure can comprise, for example, from 1.5 wt % to 4 wt % of an adhesion promoter, from 1.7 wt % to 3.8 wt %, from 1.9 wt % to 3.6 wt % to 2.1 wt % to 3.4 wt % from 2.3 wt % to 3.2 wt %, from 2.5 wt % to 3.0 wt %, from 2.0 wt % to 4 wt %, or from 2.5 wt % to 4 wt % of an adhesion promoter, where wt % is based on the total weight of the composition.

Low density compositions can comprise, for example, from 1.8 wt % to 3.8 wt % of an adhesion promoter, from 2.0 wt % to 3.6 wt %, from 2.2 wt % to 3.4 wt %, from 2.4 wt % to 3.2 wt %, from 2.6 wt % to 3.0 wt % of an adhesion promoter or combination of adhesion promoters, where wt % is based on the total weight of a composition.

Compositions provided by the present disclosure can comprise an adhesion promoter comprising a phenolic adhesion promoter or combination of phenolic adhesion promoters, and an amine-functional silane or combination of amine-functional silanes.

An adhesion promoter can comprise, for example, from 45 wt % to 65 wt % of a phenolic adhesion promoter; and from 35 wt % to 55 wt % of an amine-functional silane, where wt % is based on the total weight of the adhesion promoter in a composition.

An adhesion promoter can comprise, for example, from 44 wt % to 64 wt % of a phenolic adhesion promoter, and from 36 wt % to 56 wt % of an organosilane, such as from 50 wt % to 58 wt % of a phenolic adhesion promoter and from 41 wt % to 51 wt % of an organosilane, where wt % is based on the total weight of the adhesion promoter in a composition.

In comparison, a typical sealant composition can comprise less than 0.5 wt % of adhesion promoters, such as less than 0.2 wt %, where wt % is based on the total weight of the composition.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group. An amine-functional silane can comprise, for example, from 40 wt % to 60 wt % of a primary amine-functional silane; and from 40 wt % to 60 wt % of a secondary amine-functional silane; from 45 wt % to 55 wt % of a primary amine-functional silane and from 45 wt % to 55 wt % of a secondary amine-functional silane; or from 47 wt % to 53 wt % of a primary amine-functional silane and from 47 wt % to 53 wt % of a secondary amine-functional silane; where wt % is based on the total weight of the amine-functional silane in a composition.

The ratio of amine equivalents derived from the primary amine-functional silane and the secondary amine-functional silane can be, for example, from 1.2:1 to 1:1.2, from 1.1:1 to 1:1.1, or from 1.05:1 to 1:1.05.

A secondary amine-functional silane can be a sterically hindered amine-functional silane. In a sterically hindered amine-functional silane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional silanes can be monomeric amine-functional silanes having a molecular weight, for example, from 100 Daltons to 1000 Daltons, from 100 Daltons to 800 Daltons, from 100 Daltons to 600 Daltons, or from 200 Daltons to 500 Daltons.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl) pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethylaminomethyl)phenethyltrimethoxysilane and N-(2-aminoethyl)-3-aminopropyltrimethoxysilane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Suitable amine-functional silanes are commercially available, for example, from Gelest Inc. and from Dow Corning Corporation.

Compositions provided by the present disclosure can comprise a reactive diluent or combination of reactive diluents. A reactive diluent can be used to reduce the viscosity of the composition. A reactive diluent can be a low molecular weight monoepoxide, a low molecular weight polyepoxide such as a diepoxide, or a combination thereof.

Compositions provided by the present disclosure can comprise, for example, from 0.1 wt % to 4 wt % of a reactive diluent, from 0.2 wt % to 3.5 wt %, from 0.3 wt % to 2 wt %, from 0.4 wt % to 1.5 wt %, or from 0.5 wt % to 1.5 wt %, where wt % is based on the total weight of the composition.

Reactive diluents can be, for example, aliphatic, aromatic, or cycloaliphatic.

A reactive diluent can be an epoxy-functional reactive diluent such as a polyepoxide. Epoxy-functional reactive diluents can comprise low viscosity glycidyl ethers that can react with the thiol-terminated polythioether to become part of the cross-linked cured composition.

For example, a polyepoxide reactive diluent can be a diepoxide or combination of diepoxides.

Suitable diepoxide reactive diluents include aliphatic diepoxides.

Examples of suitable epoxy-functional reactive diluents include neopentyl glycol diglycidyl ether, butyl glycidyl ether, trimethylolpropane triglycidyl ether, sorbitol polyglycidyl ether, trimethylolethane triglycidyl ether, 1,4-butanediol diglycidyl ether, 2-ethylhexyl glycidyl ether, glycidyl ester of neodecanoic acid, glycidyl ester of dimer acid, $C_{12-14}$ aliphatic glycidyl ether, cyclohexanedimethanol diglycidyl ether, castor oil triglycidyl ether, propoxylated glycerin triglycidyl ether, propoxylated glycerin triglycidyl ether, propylene glycol diglycidyl ether, O-cresyl glycidyl ether, p-tertiary butyl phenyl glycidyl ether, noryl phenyl glycidyl ether, phenyl glycidyl ether, 1,4-butanediol diglycidyl ether, 1,6-hexane diol diglycidyl ether, cyclohexane dimethanol, neopentyl glycol diglycidyl ether, polypropylene glycol diglycidyl ether, dipropylene glycoldiglycidyl ether, pentaerythritol based polyglycidyl ether, 1,3-bis(2,3-epoxypropoxy)2,2-dimethylpropane, oxirane-mono[($C_{8-10}$ alkoxy)-methyl]derivatives, alkyl ($C_{12-14}$) glycidyl ether, 1,2-epoxy-3-(2-methylphenoxy)propane, 1,4-bis(2,3-epoxy(propyloxy)butane, trimethylopropane-epichlorohydrin copolymer, ethylhexylglycidyl ether, 1,4-butanediol-diglycidyl ether, polyglycerol-3-glycidyl ether, glycerol-triglycidyl ether, neopentylglycol-diglycidyl ether, polypropyleneglycol-diglycidyl ether, and trimethylolpropane-triglycidyl ether.

Examples of suitable diepoxides useful as reactive diluents include, include (poly)ethylene glycol diglycidyl ether, (poly)propylene glycol diglycidyl ether, butanediol diglycidyl ether, and neopentyl glycol diglycidyl ether; and examples of a suitable triepoxide compounds include trimethylolpropane triglycidyl ether and glycerin triglycidyl ether.

Other suitable diexpoxides include trishydroxyl phenyl ethane, resorcinol diglycidyl ether, hydrogenated bisphenol A diglycidyl ether, hexahydrophthalic acid diglycidyl ether, glycidyl amine of m-xylenediamine, modified bisphenol A diglycidyl ether, n-1,4-butanediol diglycidyl ether, 1,4-cyclohexane dimethanol diglycidyl ether, neopentyl glycol diglycidyl ether, dipropylene glycol diglycidyl ether, polypropylene glycol(400) diglycidyl ether, 1,6-hexanediol diglycidyl ether, ethylene glycol diglycidyl ether, trimethylol propane triglycidyl ether, trimethylol ethane triglycidyl ether, Castor oil glycidyl ether, propoxylated glycol triglycidyl ether, polyglycerol-3-polyglycidyl ether, pentaerythritol polyglycidyl ether, sorbitol polyglycidyl ether, or a combination of any of the foregoing.

A reactive diluent can have a molecular weight, for example, from 100 Daltons to 1000 Daltons, from 100 Daltons to 800 Daltons, from 100 Daltons to 600 Daltons, or from 200 Daltons to 500 Daltons. A reactive diluent such as a diglycidyl ether can have an epoxy equivalent weight from 100 g/eq to 200 g/eq, from 100 g/eq to 160 g/eq, from 110 g/eq to 150 g/eq or from 120 g/eq to 140 g/eq. A reactive dilute diluent such as a diglycidyl ether can have a viscosity from 5 cps to 50 cps, from 10 cps to 40 cps, from 10 cps to 30 cps, or from 10 cps to 20 cps. A reactive diluent such as a diglycidyl ether can be characterized by a viscosity from 5 cps to 30 cps, from 6 cps to 25 cps, from 7 cps to 10 cps, or from 10 cps to 18 cps, at 25° C.

Low density sealant compositions provided by the present disclosure comprise low density microcapsules. A low density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 μm to 70 μm, in some cases 10 μm to 24 μm, or from 10 μm to 17 μm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™DE microspheres available from Akzo Nobel. Examples of suitable Expancel™ DE microspheres include Expancel™ 920 DE 40 and Expancel™ 920 DE 80. Suitable low density microcapsules are also available from Kureha Corporation.

Suitable low density filler such as low density microcapsules can have a mean diameter (d0.5), for example, from 1 μm to 100 μm, from 10 μm to 80 μm, or from 10 μm to 50 μm, as determined according to ASTM D1475.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low density filler such as low density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low density filler such as low microcapsules can be characterized by a mean particle diameter from 1 μm to 100 μm and can have a substantially spherical shape. Low density filler such as low density microcapsules can be characterized, for example, by a mean particle diameter from 10 μm to 100 μm, from 10 μm to 60 μm, from 10 μm to 40 μm, or from 10 μm to 30 μm, as determined according to ASTM D1475.

Low density filler can comprise uncoated microcapsules, coated microcapsules, or combinations thereof.

Low density filler such as low density microcapsules can comprise expanded microcapsules or microballoons having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low density microcapsules can be reacted with an aminoplast resin such as a urea/formaldehyde resin to provide a coating of a thermoset resin on the outer surface of the particle.

Low density filler such as low density microcapsules can comprise thermally expandable thermoplastic microcapsules having an exterior coating of an aminoplast resin, such as a melamine resin. The coated low density microcapsules can have an exterior coating of a melamine resin, where the coating can have a thickness, for example, less than 2 μm, less than 1 μm, or less than 0.5 μm. The melamine coating on the light weight microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 μm, less than 20 μm, less than 15 μm, or less than 5 μm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as CYMEL™ 300, CYMEL™ 301, CYMEL™ 303LF, CYMEL™ 303ULF, CYMEL™ 304, CYMEL™ 350, CYMEL 3745, CYMEL™ XW-3106, CYMEL™ MM-100, CYMEL™ 370, CYMEL™ 373, CYMEL™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90.

A suitable aminoplast resin can comprise a urea-formaldehyde resin.

Aminoplast resin-coated particles are distinct from uncoated particles that are merely incorporated into a polymer network, such as is the case when uncoated low density particles are dispersed in a film-forming binder. For aminoplast resin-coated particles, a thin film is deposited on the exterior surface of individual discrete particles such as thermally expanded microcapsules. These aminoplast resin-coated particles may then be dispersed in a film-forming binder, thereby resulting in dispersion of the coated particles throughout a polymer network. The thin coating of an aminoplast resin can cover, for example from 70% to 100%, from 80% to 100%, or from 90% to 100% of the exterior surface of a low density particle such as a thermally expanded microcapsule. The coating of an aminoplast resin can form a substantially continuous covering on the exterior surface of a low density particle.

The low density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ASTM D1475. For example, Expancel™ 920 DE 40 and Expancel™ 920 DE 80 can be characterized by a specific gravity of about 0.03, wherein the specific gravity is determined according to ASTM D1475.

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

Compositions provided by the present disclosure can be formulated for use as aerospace sealants.

Low density compositions can comprise, for example, from 50 wt % to 70 wt % of a thiol-terminated polythioether prepolymer, from 53 wt % to 69 wt %, from 55 wt % to 67 wt %, from 57 wt % to 65 wt %, or from 59 wt % to 63 wt % of a thiol-terminated polythioether prepolymer, where wt % is based on the total weight of the composition.

Low density compositions can comprise, for example, from 13 wt % to 23 wt % of a polyepoxide, from 14 wt % to 22 wt %, from 15 wt % to 21 wt %, from 16 wt % to 20 wt %, from 17 wt % to 19 wt % of a polyepoxide, where wt % is based on the total weight of the composition.

Low density compositions can comprise, for example, from 6 wt % to 18 wt % of an inorganic filler, from 7 wt % to 17 wt %, from 8 wt % to 16 wt %, from 9 wt % to 15 wt %, from 10 wt % to 14 wt %, or from 11 wt % to 13 wt % of an inorganic filler, where wt % is based on the total weight of the composition.

Low density compositions can comprise, for example, from 2.6 wt % to 4.0 wt % of low density microcapsules, from 2.6 wt % to 3.8 wt %, from 2.7 wt % to 3.6 wt %, from 2.8 wt % to 3.5 wt %, from 2.9 wt % to 3.4 wt %, or from 3.0 wt % to 3.3 wt %, of low density microcapsules, where wt % is based on the total weight of the composition.

Low density compositions can comprise, for example, from 50 wt % to 70 wt % of a thiol-terminated polythioether prepolymer, from 13 wt % to 23 wt % of a polyepoxide; and from 2.7 wt % to 4.0 wt % of low density microcapsules, where wt % is based on the total weight of the composition.

Low density compositions can comprise, for example, from 53 wt % to 67 wt % of a thiol-terminated polythioether prepolymer, from 14 wt % to 22 wt % of a polyepoxide; and from 2.8 wt % to 3.8 wt % of low density microcapsules, where wt % is based on the total weight of the composition.

Low density compositions can comprise, for example, from 55 wt % to 65 wt % of a thiol-terminated polythioether prepolymer, from 15 wt % to 21 wt % of a polyepoxide; and from 2.9 wt % to 3.8 wt % of low density microcapsules, where wt % is based on the total weight of the composition.

Low density compositions can comprise, for example, from 57 wt % to 63 wt % of a thiol-terminated polythioether prepolymer, from 16 wt % to 20 wt % of a polyepoxide; and from 2.9 wt % to 3.3 wt % of low density microcapsules, where wt % is based on the total weight of the composition.

Low density compositions can comprise, for example, from 59 wt % to 61 wt % of a thiol-terminated polythioether prepolymer, from 17 wt % to 19 wt % of a polyepoxide; and from 2.9 wt % to 3.2 wt % of low density microcapsules, where wt % is based on the total weight of the composition.

Low density compositions can comprise, for example, from 51 wt % to 69 wt % of a thiol-terminated polythioether prepolymer, from 13 wt % to 23 wt % of a polyepoxide; from 6 wt % to 18 wt % of an inorganic filler; and from 2.7 wt % to 4.0 wt % of low density microcapsules, where wt % is based on the total weight of the composition.

Low density compositions can comprise, for example, from 53 wt % to 67 wt % of a thiol-terminated polythioether prepolymer, from 14 wt % to 22 wt % of a polyepoxide; from 7 wt % to 17 wt % of an inorganic filler; and from 2.8 wt % to 3.8 wt % of low density microcapsules, where wt % is based on the total weight of the composition.

Low density compositions can comprise, for example, from 55 wt % to 65 wt % of a thiol-terminated polythioether prepolymer, from 15 wt % to 21 wt % of a polyepoxide; from 8 wt % to 16 wt % of an inorganic filler; and from 2.9 wt % to 3.8 wt % of low density microcapsules, where wt % is based on the total weight of the composition.

Low density compositions can comprise, for example, from 57 wt % to 63 wt % of a thiol-terminated polythioether, from 16 wt % to 20 wt % of a polyepoxide; from 9 wt % to 15 wt % of an inorganic filler; and from 2.9 wt % to 3.3 wt % of low density microcapsules, where wt % is based on the total weight of the composition.

Low density compositions can comprise, for example, from 59 wt % to 61 wt % of a thiol-terminated polythioether prepolymer, from 17 wt % to 19 wt % of a polyepoxide; from 10 wt % to 13 wt % of an inorganic filler; and from 2.9 wt % to 3.2 wt % of low density microcapsules, where wt % is based on the total weight of the composition.

The amount of low density microcapsules in compositions provided by the present disclosure can also be characterized in terms of vol %, where vol % refers to the amount of low density microcapsules with respect to the total volume of a composition. The vol % of each of the components of a composition can be derived from the wt % and density of each of the components as is well known in the art. The vol % of a component such as a low density filler can be estimated from the specific gravity of the composition and the specific gravity of the component such as a low density filler, and the wt % of the component in the composition. For example, for a composition having specific gravity of 0.77 comprising a low density filler having a specific gravity of 0.056, and the composition contains 3.15 wt % of the filler, the composition will have about 43 vol % of the low density filler (3.15×(0.77/0.056)).

For example, low density compositions of the present disclosure can comprise from 30 vol % to 60 vol % of low density microcapsules, from 35 vol % to 55 vol %, from 40 vol % to 50 vol %, or from 42 vol % to 48 vol % of low density microcapsules, where vol % is based on the total volume of the composition.

To achieve low specific gravity sealants, the wt % and the vol % of the light weight filler in the sealant composition must be increased substantially compared to light weight sealants having a specific gravity of 1 or more. For example, the low specific gravity sealant compositions provided by the present disclosure having a specific gravity of around 0.75, have a light weight particle content from about 45 vol % to about 50 vol %. As a consequence the vol % of the polymeric binder in the composition is substantially reduced and the interfacial surface area between the filler and the binder is substantially increased.

Uncured low density sealant compositions provided by the present disclosure can have from 1.1 equivalents epoxy to 1.3 equivalents epoxy to the thiol equivalents, such as from 1.1 to 1.25 equivalents epoxy, from 1.1 to 1.2, or from 1.1 to 1.15 equivalents epoxy to thiol.

Compositions provided by the present disclosure can comprise, for example, from 50 wt % to 70 wt % of a thiol-terminated polythioether, from 1 wt % to 5 wt % of an adhesion promoter, from 8 wt % to 18 wt % of an inorganic filler, from 2.6 wt % to 4.0 wt % of a low density filler, from 13 wt % to 23 wt % of a polyepoxide, and from 0.1 wt % to 2 wt % of a reactive diluent, wherein wt % is based on the total weight of the composition. In the preceding compositions, the compositions can comprise, for example, from 0.5 wt % to 2.5 wt % of a phenolic adhesion promoter, and from 0.5 wt % to 2.5 wt % of an organo-functional silane; and from 0.5 wt % to 2 wt % of a polyepoxide having an epoxy functionality from 2.5 to 3, and from 13 wt % to 21 wt % of a difunctional polyepoxide such as a hydroxyl-functional difunctional polyepoxide, where wt % is based on the total weight of the composition.

Compositions provided by the present disclosure can comprise, for example, from 56 wt % to 66 wt % of a thiol-terminated polythioether, from 2 wt % to 4 wt % of an adhesion promoter, from 10 wt % to 14 wt % of an inorganic filler, from 2 wt % to 4 wt % of a low density filler, from 16 wt % to 20 wt % of a polyepoxide, and from 0.5 wt % to 1.5 wt % of a reactive diluent, wherein wt % is based on the total weight of the composition. In the preceding compositions, the compositions can comprise, for example, from 1.0 wt % to 2.0 wt % of a phenolic adhesion promoter, and from 1.0 wt % to 2.0 wt % of an organo-functional silane; and from 1.0 wt % to 1.5 wt % of a polyepoxide having an epoxy functionality from 2.5 to 3.2, and from 15 wt % to 19 wt % of a difunctional polyepoxide such as a hydroxyl-functional difunctional polyepoxide, where wt % is based on the total weight of the composition.

Compositions such as sealants provided by the present disclosure may further comprise one or more additives such as a curing catalyst, a plasticizer, a reactive diluent, a solvent, or a combination of any of the foregoing.

Compositions provided by the present disclosure can include one or more catalysts.

A suitable catalyst can accelerate the reaction between thiol groups and epoxy groups, and can include, for example, an amine catalyst.

A suitable amine catalyst for use in compositions of the present disclosure is capable of catalyzing the reaction between thiol and epoxy groups.

Examples of suitable amine catalysts include tertiary amine catalysts such as N,N-dimethylethanolamine, triethylene diamine (TEDA), bis(2-dimethylaminoethyl)ether (BDMAE), N-ethylmorpholine, N',N'-dimethylpiperazine, N,N,N',N',N'-pentamethyl-diethylene-triamine (PMDETA), N,N-dimethylcyclohexylamine (DMCHA), N,N-dimethylbenzylamine (DMBA), N,N-dimethylcethylamine, N,N,N'N'',N'''-pentamethyl-dipropylene-triamine (PMDPTA), triethylamine, 1-(2-hydroxypropyl)imidazole, 1,4-diazabicyclo[2.2.2]octane (DABCO®), and DMP-30® (an accelerant composition including 2,4,6-tris(dimethylaminomethyl)phenol), dimethylethanolamine (DMEA), bis-(2-dimethylaminoethyl)ether, N-ethylmorpholine, triethylamine, 1,8-diazabicyclo[5.4.0]undecene-7 (DBU), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

A catalyst can comprise an imidazole catalyst. Examples of suitable imidazole catalysts include imidazole, 2-methylimidazole, 2-ethylimidazole, 2-isopropylimidazole, 2-undecylimidazole, 2-dodecylimidazole, 2-phenylimidazole, 2-ethyl-4-methyl-imidazole, 2-benzylimidazole, 2,4,5-trimethylimidazole, and a combination of any of the foregoing.

Other examples of suitable imidazoles include substituted imidazoles such as alkyl-substituted imidazoles include 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 2-heptadecylimidazole, 1-benzyl-2-methylimidazole, 1-propyl-2-methylimidazole, 1-cyanoethyl-2-methylimidazole, 1-cyanoethyl-1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole; and aryl-substituted imidazoles including phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, and 2-p-methoxystyrylimidazole.

An imidazole catalyst can comprise an imidazole-epoxy adduct. An imidazole-epoxy adduct can be obtained by reacting an imidazole compound with an epoxy compound. An imidazole compound can be, for example, any of those disclosed herein. Examples of suitable epoxy compounds for forming an imidazole-epoxy adduct include 1,2-epoxybutane, 1,2-epoxyhexane, 1,2-epoxyoctane, styreneoxide, n-butyl glycidyl ether, hexyl glycidyl ether, phenyl glycidyl ether, glycidyl acetate, glycidyl butyrate, glycidyl hexoate, and glycidyl benzoate. Examples of suitable imidazole-epoxy adducts formed by the addition of an imidazole compound to an epoxy compound include, for example, NOVACURE™ HX—3722 (an encapsulated imidazole/bisphenol A epoxy adduct dispersed in bisphenol A epoxy) and NOVACURE™ HX-3921 HP.

A catalyst can comprise a combination of an amine catalyst and an imidazole catalyst.

A composition can comprise, for example, from 0.2 wt % to 2 wt % of a catalyst or combination of catalysts, from 0.4 wt % to 1.8 wt %, from 0.6 wt % to 1.6 wt %, from 0.8 wt % to 1.4 wt %, or from 0.8 wt % to 1.2 wt % of a catalyst or combination of catalysts such as a combination of an amine catalyst and an imidazole catalyst, where wt % is based on the total weight of the composition.

Compositions and sealants provided by the present disclosure can comprise a plasticizer. A plasticizer can comprise, for example, phthalate esters, chlorinated paraffins, or hydrogenated terphenyls. Examples of suitable plasticizers also include HB-40™ modified polyphenyl and tung oil.

Compositions and sealants provided by the present disclosure can comprise, for example, less than 2 wt % of a plasticizer, less than 1 wt %, or less than 0.5 wt % of a plasticizer, where wt % is based on the total weight of the composition.

Compositions provided by the present disclose can comprise, for example, from 50 wt % to 70 wt % of a thiol-terminated polythioether prepolymer; from 15 wt % to 21 wt % of a polyepoxide; and from 35 vol % to 55 vol % of a low density filler, wherein the low density filler comprises microcapsules comprising a coating of an aminoplast resin, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 15 wt % to 21 wt % of a polyepoxide, wherein the polyepoxide comprises a diglycidyl ether of bisphenol A and a novolac epoxy resin; and from 35 vol % to 55 vol % of a low density filler, wherein the low density filler comprises microcapsules comprising a coating of an aminoplast resin, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 15 wt % to 21 wt % of a polyepoxide, wherein the polyepoxide comprises a diglycidyl ether of bisphenol A and a novolac epoxy resin; and the polyepoxide comprises at least 85 wt % of the diglycidyl ether of bisphenol A, wherein wt % is based on the total weight of the polyepoxide; and from 35 vol % to 55 vol % of a low density filler, wherein the low density filler comprises microcapsules comprising a coating of an aminoplast resin, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 15 wt % to 21 wt % of a polyepoxide, wherein the polyepoxide comprises: from 86 wt % to 99 wt % of the diglycidyl ether of bisphenol A; and from 1 wt % to 11 wt % of the novolac epoxy resin, wherein wt % is based on the total weight of the polyepoxide; and from 35 vol % to 55 vol % of a low density filler, wherein the low density filler comprises microcapsules comprising a coating of an aminoplast resin, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 15 wt % to 21 wt % of a polyepoxide, wherein the polyepoxide comprises a diglycidyl ether of bisphenol A and a novolac epoxy resin; where the diglycidyl ether of bisphenol A comprises pendent hydroxyl groups; and from 35 vol % to 55 vol % of a low density filler, wherein the low density filler comprises microcapsules comprising a coating of an aminoplast resin, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin; from 6 wt % to 18 wt % of an inorganic filler; from 1.8 wt % to 3.8 wt % of an adhesion promoter; and from 0.2 wt % to 3.0 wt % of an epoxy-functional reactive diluent, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin; from 1.8 wt % to 3.8 wt % of an adhesion promoter, wherein the adhesion promoter comprises a phenolic adhesion promoter and an amine-functional silane; and wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin;

from 1.8 wt % to 3.8 wt % of an adhesion promoter, wherein the adhesion promoter comprises from 45 wt % to 65 wt % of the phenolic adhesion promoter, and from 35 wt % to 55 wt % of the amine-functional silane, wherein wt % is based on the total weight of the adhesion promoter; and wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin; from 1.8 wt % to 3.8 wt % of an adhesion promoter, wherein the adhesion promoter comprises a phenolic adhesion promoter and an amine-functional silane, wherein the amine-functional silane comprises: from 40 wt % to 60 wt % of the primary amine-functional silane; and from 40 wt % to 60 wt % of the secondary amine-functional silane, wherein wt % is based on the total weight of the amine-functional silane; and wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin; from 6 wt % to 18 wt % of an inorganic filler; from 1.8 wt % to 3.8 wt % of an adhesion promoter; and from 0.2 wt % to 3 wt % of an epoxy-functional reactive diluent, wherein the epoxy-functional reactive diluent comprises an aliphatic diglycidyl ether, wherein wt % is based on the total weight of the composition, and vol % is based on the total volume of the composition.

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin, wherein wt % is based on the total weight of the composition, and vol % is based on the total volume of the composition, and wherein the composition is characterized by a specific gravity within a range from 0.65 to 0.85, wherein the specific gravity is determined according to ASTM D1475 (modified).

Compositions provided by the present disclose can comprise, for example, from 50 wt % to 70 wt % of a thiol-terminated polythioether prepolymer; from 13 wt % to 23 wt % of a polyepoxide; and from 35 vol % to 55 vol % of a low density filler, wherein the low density filler comprises microcapsules comprising a coating of an aminoplast resin, wherein wt % is based on the total weight of the composition, and vol % is based on the total volume of the composition, wherein the composition is characterized by a specific gravity within a range from 0.65 to 0.85, wherein the specific gravity is determined according to ASTM D1475 (modified) and wherein the composition comprises from 2.8 wt % to 4.0 wt % of the low density filler, wherein the low density filler is characterized by a specific gravity within a range from 0.01 to 0.09, such as from 0.02 to 0.08, or from 0.03 to 0.06, wherein the specific gravity of the low density filler is determined according to ASTM D1475.

Compositions provided by the present disclose can comprise, for example, from 50 wt % to 70 wt % of a thiol-terminated polythioether prepolymer; from 13 wt % to 23 wt % of a polyepoxide, wherein the polyepoxide comprises a diglycidyl ether of bisphenol A and a novolac epoxy resin, wherein the composition comprises: from 10 wt % to 25 wt % of a diglycidyl ether of bisphenol A; and from 0.2 wt % to 2 wt % of a novolac epoxy resin; from 2.8 wt % to 4.0 wt % of the low density filler, wherein the low density filler is characterized by a specific gravity within a range from 0.01 to 0.09, wherein the specific gravity is determined according to ASTM D1475 from 6 wt % to 18 wt % of an inorganic filler; from 1.8 wt % to 3.8 wt % of an adhesion promoter, wherein the adhesion promoter comprises a phenolic adhesion promoter and an amine-functional silane, wherein the compositions comprise from 1 wt % to 3 wt % of a phenolic adhesion promoter; and from 0.5 wt % to 2 wt % of an amine-functional silane; and from 0.2 wt % to 3 wt % of an epoxy-functional reactive diluent, wherein wt % is based on the total weight of the composition.

Compositions provided by the present disclose can comprise, for example, from 50 wt % to 70 wt % of a thiol-terminated polythioether prepolymer; from 13 wt % to 23 wt % of a polyepoxide, wherein the polyepoxide comprises a diglycidyl ether of bisphenol A and a novolac epoxy resin, wherein the composition comprises: from 10 wt % to 25 wt % of a diglycidyl ether of bisphenol A; and from 0.2 wt % to 2 wt % of a novolac epoxy resin; from 2.8 wt % to 4.0 wt % of the low density filler, wherein the low density filler is characterized by a specific gravity within a range from 0.01 to 0.09, wherein the specific gravity is determined according to ASTM D1475; from 6 wt % to 18 wt % of an inorganic filler; from 1.8 wt % to 3.8 wt % of an adhesion promoter, wherein the adhesion promoter comprises a phenolic adhesion promoter and an amine-functional silane, wherein the composition comprises: from 1 wt % to 3 wt % of a phenolic adhesion promoter; and from 0.5 wt % to 2 wt % of an amine-functional silane, wherein the amine-functional silane comprises a primary amine-functional silane and a secondary amine-functional, wherein the compositions comprise from 0.4 wt % to 0.9 wt % of a primary amine-functional silane; and from 0.4 wt % to 0.9 wt % of a secondary amine-functional silane; and from 0.2 wt % to 3 wt % of an epoxy-functional reactive diluent, wherein wt % is based on the total weight of the composition.

Compositions provided by the present disclose can comprise, for example, from 50 wt % to 70 wt % of a thiol-terminated polythioether prepolymer; from 13 wt % to 23 wt % of a polyepoxide, wherein the polyepoxide comprises a diglycidyl ether of bisphenol A and a novolac epoxy resin, wherein the composition comprises: from 10 wt % to 25 wt % of a diglycidyl ether of bisphenol A; and from 0.2 wt % to 2 wt % of a novolac epoxy resin; from 2.8 wt % to 4.0 wt % of the low density filler, wherein the low density filler is characterized by a specific gravity within a range from 0.01 to 0.09, wherein the specific gravity is determined according to ASTM D1475 from 6 wt % to 18 wt % of an inorganic filler; from 1.8 wt % to 3.8 wt % of an adhesion promoter, wherein the adhesion promoter comprises a phenolic adhesion promoter and an amine-functional silane, wherein the compositions comprise from 1 wt % to 3 wt % of a phenolic adhesion promoter; and from 0.5 wt % to 2 wt % of an amine-functional silane; and from 0.2 wt % to 3 wt % of an epoxy-functional reactive diluent, wherein the epoxy-functional reactive diluent comprises an aliphatic diglycidyl ether, wherein wt % is based on the total weight of the composition.

Compositions provided by the present disclose can comprise, for example, from 50 wt % to 70 wt % of a thiol-terminated polythioether prepolymer; from 135 wt % to 23 wt % of a polyepoxide, wherein the polyepoxide comprises a diglycidyl ether of bisphenol A and a novolac epoxy resin, wherein the composition comprises from 10 wt % to 25 wt % of a diglycidyl ether of bisphenol A, wherein the diglycidyl ether of bisphenol A comprises pendent hydroxyl groups; and from 0.2 wt % to 2 wt % of a novolac epoxy resin; from 2.8 wt % to 4.0 wt % of the low density filler, wherein the low density filler is characterized by a specific gravity within a range from 0.01 to 0.09, wherein the specific gravity is determined according to ASTM D1475 from 6 wt % to 18 wt % of an inorganic filler; from 1.8 wt % to 3.8 wt % of an adhesion promoter, wherein the adhesion promoter comprises a phenolic adhesion promoter and an amine-functional silane, wherein the compositions comprise from 1 wt % to 3 wt % of a phenolic adhesion promoter; and from 0.5 wt % to 2 wt % of an amine-functional silane; and from 0.2 wt % to 3 wt % of an epoxy-functional reactive diluent, wherein wt % is based on the total weight of the composition.

Compositions provided by the present disclose can comprise, for example, from 50 wt % to 70 wt % of a thiol-terminated polythioether prepolymer; from 13 wt % to 23 wt % of a polyepoxide, wherein the polyepoxide comprises a diglycidyl ether of bisphenol A and a novolac epoxy resin, wherein the compositions comprise from 10 wt % to 25 wt % of a diglycidyl ether of bisphenol A, wherein the diglycidyl ether of bisphenol A comprises pendent hydroxyl groups; and from 0.2 wt % to 2 wt % of a novolac epoxy resin; from 2.5 wt % to 4.0 wt % of the low density filler, wherein the low density filler is characterized by a specific gravity within a range from 0.01 to 0.09, wherein the specific gravity is determined according to ASTM D1475 from 6 wt % to 18 wt % of an inorganic filler; from 1.8 wt % to 3.8 wt % of an adhesion promoter, wherein the adhesion promoter comprises a phenolic adhesion promoter and an amine-functional silane, wherein the compositions comprise from 1 wt % to 3 wt % of a phenolic adhesion promoter; and from 0.5 wt % to 2 wt % of an amine-functional silane; and from 0.2 wt % to 3 wt % of an epoxy-functional reactive diluent, wherein the epoxy-functional reactive diluent comprises an aliphatic diglycidyl ether, wherein wt % is based on the total weight of the composition.

Curable sealant systems of the present disclosure can be provided as two-part sealant compositions. The two-parts can be maintained separately and can be combined prior to use. A first part can comprise thiol-terminated polythioether prepolymers, inorganic filler, low-density microcapsules, adhesion promoter, catalyst, and other additives. A second part can comprise a polyepoxide curing agent, inorganic filler and other additives. Other additives can include phenolic adhesion promoters, silane adhesion promoters, amine catalysts, plasticizers, pigments, solvents, reactive diluents, and a combination of any of the foregoing.

Low density sealants provided by the present disclosure can be provided as a two-part sealant composition. The two-parts can be stored separately and combined and mixed just prior to use.

A first part of a sealant system can comprise the thiol-terminated polythioether, adhesion promoter, inorganic filler, curing catalyst, low density microcapsules, and other additives such as plasticizer and solvent.

A second part of a sealant system can comprise the polyepoxide resin, inorganic filler, and other additives such as pigment, reactive diluent, and adhesion promoter.

The components of the first part of a sealant system and the second part of a sealant system can be selected to separate the reactive components and to achieve, for example, desirable rheological properties for storage stability and to facilitate mixing and homogeneous dispersion of the components.

For example, a first part of a sealant system can comprise, for example, from 66 wt % to 86 wt % of a thiol-terminated polythioether prepolymer, from 69 wt % to 83 wt %, or from 71 wt % to 80 wt % of a thiol-terminated polythioether prepolymer; from 10 wt % to 20 wt % of inorganic fillers, from 12 wt % to 18 wt %, or from 14 wt % to 16 wt % of inorganic fillers; and from 2 wt % to 6 wt % of a low density microcapsules, from 3 wt % to 5 wt %, or from 3.5 wt % to 4.5 wt % of a low density microcapsules, wherein wt % is based on the total weight of the first part of a sealant system.

A first part of a sealant system can comprise, for example, from 66 wt % to 86 wt % of a thiol-terminated polythioether, from 1 wt % to 7 wt % of an adhesion promoter, from 10 wt % to 20 wt % of an inorganic filler, and from 2 wt % to 6 wt % of a light weight filler, wherein wt % is based on the total weight of the first part of a sealant system.

A first part of a sealant system can comprise, for example, from 71 wt % to 81 wt % of a thiol-terminated polythioether, from 3 wt % to 5 wt % of an adhesion promoter, from 13 wt % to 17 wt % of an inorganic filler, and from 3 wt % to 5 wt % of a light weight filler, wherein wt % is based on the total weight of the first part of a sealant system.

For example, a second part of a sealant system can comprise, for example, from 77 wt % to 97 wt % of a polyepoxide, from 80 wt % to 94 wt % or a polyepoxide, or from 83 wt % to 91 wt % of a polyepoxide; and from 2.5 wt % to 6.5 wt % or an inorganic filler, from 3 wt % to 6 wt %, or from 3.5 wt % to 5.5 wt % of an inorganic filler, wherein wt % is based on the total weight of the second part of a sealant system.

A second part of a sealant system can comprise, for example, from 76 wt % to 96 wt % of a polyepoxide, from 2 wt % to 8 wt % or an epoxy-functional reactive diluent, from 1 wt % to 5 wt % of an adhesion promoter, and from 2 wt % to 8 wt % of an inorganic filler, wherein wt % is based on the total weight of the second part of a sealant system.

A second part of a sealant system can comprise, for example, from 81 wt % to 91 wt % of a polyepoxide, from 4 wt % to 6 wt % or an epoxy-functional reactive diluent, from 2 wt % to 4 wt % of an adhesion promoter, and from 4 wt % to 6 wt % of an inorganic filler, wherein wt % is based on the total weight of the second part of a sealant system.

A first part of a sealant system can comprise, for example, from 66 wt % to 86 wt % of a thiol-terminated polythioether prepolymer, from 1.7 wt % to 3.7 wt % of an adhesion promoter, from 5 wt % to 25 wt % of an inorganic filler, and from 2 wt % to 5 wt % of low density microcapsules, where wt % is based on the total weight of the first part of a sealant system.

A first part of a sealant system can comprise, for example, from 71 wt % to 81 wt % of a thiol-terminated polythioether prepolymer, from 2.2 wt % to 3.2 wt % of an adhesion promoter, from 10 wt % to 22 wt % of an inorganic filler, and from 3 wt % to 4 wt % of low density microcapsules, where wt % is based on the total weight of the first part of a sealant system.

A second part can comprise, for example, from 77 wt % to 97 wt % of a polyepoxide, from 2 wt % to 4 wt % of an adhesion promoter, and from 3 wt % to 6 wt % of an inorganic filler, where wt % is based on the total weight of the second part.

A second part of a sealant system can comprise, for example, from 82 wt % to 92 wt % of a polyepoxide, from 2.5 wt % to 3.5 wt % of an adhesion promoter, and from 4 wt % to 5 wt % of an inorganic filler, where wt % is based on the total weight of the second part of a sealant system.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated, epoxy, urethane, graphite, fiber-glass composite, Kevlar®, acrylics, and polycarbonates. Compositions provided by the present disclosure may be applied to a coating on a substrate, such as a primer coating.

Compositions and sealants provided by the present disclosure may be applied directly onto the surface of a substrate or over an underlayer by any suitable coating process.

Methods are provided for sealing an aperture and/or surface utilizing a composition provided by the present disclosure. These methods comprise, for example, applying a composition provided by the present disclosure to an aperture and/or surface, and curing the composition. A method for sealing an aperture and/or surface can comprise applying a sealant composition provided by the present disclosure to surfaces defining an aperture and curing the sealant, to provide a sealed aperture and/or surface. A thickness of an applied composition can range, for example, from 20 mils (0.02 inches) to 0.75 inches, from 0.05 inches to 0.6 inches, from 0.1 inches to 0.5 inches, from 0.15 inches to 0.4 inches, or from 0.2 inches to 0.3 inches. A thickness of an applied composition can range, for example, from 0.05 cm to 2 cm, from 0.1 cm to 1.5 cm, from 0.2 cm to 1.25 cm, from 0.3 cm to 1.0 cm, from 0.4 cm to 0.9 cm, or from 0.5 cm to 0.8 cm.

Composition and sealants may be cured at a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C.

When cured at room temperature a sealant provided by the present disclosure can cure to a tack free surface, for example, within 24 hours, within 20 hours, within 16 hours, within 12 hours, within 6 hours, or within 3 hours, from the time of mixing.

Compositions and sealants provided by the present disclosure cure rapidly at the end of the working time. For example, a sealant can cure, at room temperature, to a tack free surface within 36 hours after the time the sealant is no longer workable (end of working time), within 24 hours, within 12 hours, within 6 hours, or within 3 hours. A sealant can cure, at room temperature, to a Shore A hardness of 30 A, for example, within 24 hours after the time the sealant is no longer workable (end of working time), within 12 hours, or within 6 hours.

Sealants provided by the present disclosure can exhibit an application time, for example, of at least 30 minutes, at least 1 hour, at least 2 hours, at least 4 hours, or at least 8 hours. The application time is reflected by the extrusion rate such that 2 hours after the two components of the sealant system are mixed the sealant will exhibit an extrusion rate of at least 15 g/min, measured according to AMS 3281 and AMS 3277.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

Sealants provided by the present disclosure can be used to seal an aperture and/or surface of aviation and aerospace vehicles. The sealants may be used to seal apertures and/or surfaces such as apertures associated with fuel tanks. To seal an aperture and/or surface a sealant may be applied to a surface or one or more surfaces defining an aperture and the sealant allowed to cure to seal the aperture and/or surface.

Compositions and sealants provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D1475 (modified) (American Society for Testing and Materials) or AMS 3269 (Aerospace Material Specification). JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, § 3.1.1 etc., available from Society of Automotive Engineers (SAE)).

A cured sealant comprising a composition provided by the present disclosure can meet or exceeds the requirements for aerospace sealants as set forth in AMS 3277.

A cured sealant comprising a composition provided by the present disclosure can meet or exceeds the requirements for aerospace sealants as set forth in AMS 3281.

Apertures and surfaces, including apertures and surfaces of aerospace vehicles, sealed with compositions provided by the present disclosure are also disclosed.

ASPECTS OF THE PRESENT INVENTION

1. A composition comprising: from 50 wt % to 70 wt % of a thiol-terminated polythioether prepolymer; from 15 wt % to 21 wt % of a polyepoxide; and from 35 vol % to 55 vol % of a low density filler, wherein the low density filler is characterized by a specific gravity less than 0.1, wherein wt % is based on the total weight of the composition, and vol % is based on the total volume of the composition, and wherein the composition is characterized by a specific gravity less than 0.9, wherein the specific gravity is determined according to ASTM D1475 (modified).

2. The composition of aspect 1, wherein when cured, the cured composition meets or exceeds the requirements for aerospace sealants as set forth in AMS 3277 and/or AMS 3281.

3. The composition of any one of aspects 1 to 2, wherein the composition is characterized by a specific gravity within a range from 0.65 to 0.85, wherein the specific gravity is determined according to ASTM D1475 (modified).

4. The composition of any one of aspects 1 to 3, wherein the thiol-terminated polythioether prepolymer comprises the chemical structure of Formula (1):

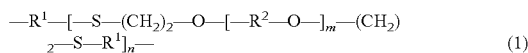

wherein,
each $R^1$ can independently comprise a $C_{2\text{-}10}$ n-alkanediyl group, a $C_{3\text{-}6}$ branched alkanediyl group, a $C_{6\text{-}8}$ cycloalkanediyl group, a $C_{6\text{-}10}$ alkanecycloalkanediyl group, a heterocyclic group, or a —[(—$CHR^3$—)$_p$—X—]$_q$—($CHR^3$)$_r$— group, wherein each $R^3$ can comprise from hydrogen or methyl;

each $R^2$ can independently comprise a $C_{2\text{-}10}$ n-alkanediyl group, a $C_{3\text{-}6}$ branched alkanediyl group, a $C_{6\text{-}8}$ cycloalkanediyl group, a $C_{6\text{-}14}$ alkanecycloalkanediyl group, a heterocyclic group, or a —[(—$CH_2$—)$_p$—X—]$_q$—($CH_2$)$_r$— group;

each X can independently comprise O, S, and —NR—, wherein R can comprise from hydrogen or methyl;
m ranges from 0 to 50;
n is an integer ranging from 1 to 60;
p is an integer ranging from 2 to 6;
q is an integer ranging from 1 to 5; and
r is an integer ranging from 2 to 10.

5. The composition of any one of aspects 1 to 4, wherein the thiol-terminated polythioether prepolymer can comprise a thiol-terminated polythioether prepolymer of Formula (2a), a thiol-terminated polythioether prepolymer of Formula (2b), or a combination thereof:

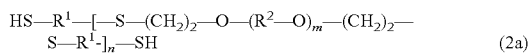

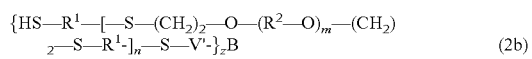

wherein,
each $R^1$ can independently comprise from $C_{2\text{-}10}$ alkanediyl, $C_{6\text{-}8}$ cycloalkanediyl, $C_{6\text{-}14}$ alkanecycloalkanediyl, $C_{5\text{-}8}$ heterocycloalkanediyl, or —[(—$CHR^3$—)$_p$—X—]$_q$—(—$CHR^3$—)$_r$—, wherein,
p is an integer from 2 to 6;
q is an integer from 1 to 5;
r is an integer from 2 to 10;
each $R^3$ can independently comprise hydrogen or methyl; and
each X can independently comprise —O—, —S—, or —NR—, wherein R can comprise hydrogen or methyl;
each $R^2$ can independently comprise $C_{1\text{-}10}$ alkanediyl, $C_{6\text{-}8}$ cycloalkanediyl, $C_{6\text{-}14}$ alkanecycloalkanediyl, or —[(—$CHR^3$—)$_p$—X—]$_q$—(—$CHR^3$—)$_r$—, wherein p, q, r, $R^3$, and X are as defined as for $R^1$;

m is an integer from 0 to 50;
n is an integer from 1 to 60;
B represents a core of a z-valent, polyfunctionalizing agent B(—V)$_z$ wherein,
z is an integer from 3 to 6; and
each V is a moiety comprising a terminal group reactive with a thiol; and
each —V'— is derived from the reaction of —V with a thiol.

6. The composition of any one of aspects 1 to 5, wherein the polyepoxide comprises hydantoin diepoxide, a diglycidyl ether of bisphenol-A, a diglycidyl ether of bisphenol-F, a novolac-type polyepoxide, epoxidized unsaturated phenolic resins, dimer acid-based epoxy resins, or a combination of any of the foregoing.

7. The composition of any one of aspects 1 to 6, wherein the polyepoxide comprises from 85 wt % to 99 wt % of a diglycidyl ether of bisphenol A, wherein wt % is based on the total weight of the polyepoxide in the composition.

8. The composition of any one of aspects 1 to 7, wherein the polyepoxide comprises from 1 wt % to 11 wt % of a novolac polyepoxide, wherein wt % is based on the total weight of the polyepoxide in the composition.

9. The composition of any one of aspects 1 to 8, wherein the polyepoxide comprises: from 86 wt % to 99 wt % of a diglycidyl ether of bisphenol A; and from 1 wt % to 11 wt % of a novolac polyepoxide; wherein wt % is based on the total weight of the polyepoxide in the composition.

10. The composition of any one of aspects 1 to 9, wherein the polyepoxide comprise a hydroxyl-functional polyepoxide or combination of hydroxyl-functional polyepoxides.

11. The composition of aspect 10, wherein, the hydroxyl-functional polyepoxide comprises a hydroxyl-functional diglycidyl ether of bisphenol A.

12. The composition of any one of aspects 1 to 11, wherein, the hydroxyl-functional diglycidyl ether of bisphenol A has structure:

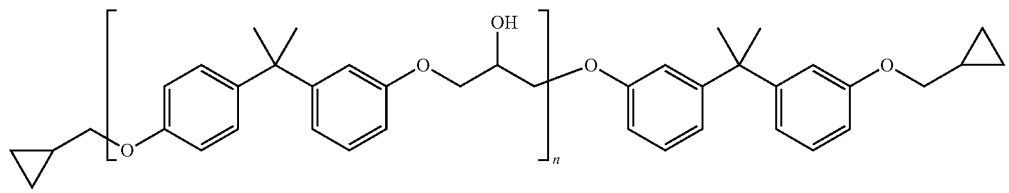

wherein n is within a range from 1 to 6.

13. The composition of any one of aspects 1 to 12, wherein the polyepoxide comprises a difunctional polyepoxide, a trifunctional polyepoxide, or a combination of any of the foregoing.

14. The composition of any one of aspects 1 to 13, wherein the composition comprises: from 86 wt % to 99 wt % of a difunctional polyepoxide; and from 1 wt % to 11 wt % of a trifunctional polyepoxide, wherein wt % is based on the total weight of the polyepoxide in the composition.

15. The composition of any one of aspects 1 to 14, wherein the composition comprises: a hydroxyl-functional polyepoxide; a trifunctional polyepoxide that does not contain pendent hydroxyl groups; a difunctional polyepoxide that does not contain pendent hydroxyl groups; a hydroxyl-functional trifunctional polyepoxide, or a combination of any of the foregoing.

16. The composition of any one of aspects 1 to 15, wherein the composition comprises: from 86 wt % to 99 wt % of a hydroxyl-functional difunctional polyepoxide; and from 1 wt % to 11 wt % of a trifunctional polyepoxide, wherein wt % is based on the total weight of the polyepoxide in the composition.

17. The composition of any one of aspects 1 to 16, wherein the composition comprises: from 86 wt % to 99 wt % of a hydroxyl-functional difunctional polyepoxide; and from 1 wt % to 11 wt % of a non-hydroxyl-functional polyepoxide, wherein wt % is based on the total weight of the polyepoxide in the composition.

18. The composition of any one of aspects 1 to 17, wherein the polyepoxide comprises: from 2 wt % to 10 wt % of a polyepoxide having an average epoxy functionality from 2.6 to 3.2; and from 90 wt % to 98 wt % of a difunctional polyepoxide; wherein wt % is based on the total weight of the polyepoxide in the composition.

19. The composition of any one of aspects 1 to 18, wherein the polyepoxide comprises a diglycidyl ether of bisphenol A and a novolac epoxy resin.

20. The composition of any one of aspects 1 to 19, wherein the polyepoxide comprises at least 85 wt % of a diglycidyl ether of bisphenol A, wherein wt % is based on the total weight of the polyepoxide in the composition.

21. The composition of any one of aspects 1 to 20, wherein the polyepoxide comprises: from 86 wt % to 99 wt % of the diglycidyl ether of bisphenol A; and from 1 wt % to 11 wt % of the novolac epoxy resin, wherein wt % is based on the total weight of the polyepoxide in the composition.

22. The composition of aspect 21, wherein the diglycidyl ether of bisphenol A comprises pendent hydroxyl groups.

23. The composition of any one of aspects 1 to 22, wherein the low density filler is characterized by a mean particle diameter within a range from 1 m to 100 μm, wherein the mean particle diameter is determined according to ASTM D1475

24. The composition of any one of aspects 1 to 23, wherein the low density filler is characterized by a specific gravity within a range from 0.01 to 0.09, wherein the specific gravity is determined according to ASTM D1475.

25. The composition of any one of aspects 1 to 24, wherein the low density filler is characterized by a specific gravity within a range from 0.03 to 0.06, wherein the specific gravity is determined according to ASTM D1475.

26. The composition of any one of aspects 1 to 25, wherein the low density filler comprises uncoated low density microcapsules, coated low density microcapsules, or a combination thereof.

27. The composition of any one of aspects 1 to 26, wherein the low density filler comprises uncoated low density microcapsules.

28. The composition of aspect 27, wherein the uncoated low density microcapsules are characterized by a specific gravity within a range from 0.01 to 0.05, wherein the specific gravity is determined according to ASTM D1475.

29. The composition of any one of aspects 1 to 28, wherein the low density filler comprises coated low density microcapsules.

30. The composition of aspect 29, wherein the coated low density microcapsules comprise a coating of an aminoplast resin.

31. The composition of any one of aspects 29 to 30, wherein the coated low density microcapsules comprise a coating of a urea-formaldehyde resin.

32. The composition of any one of aspects 29 to 31, wherein the coated low density microcapsules are characterized by a specific gravity within a range from 0.03 to 0.08, wherein the specific gravity is determined according to ASTM D1475.

33. The composition of any one of aspects 1 to 32, wherein the composition comprises from 2.8 wt % to 4.0 wt % of the low density filler, wherein the low density filler is characterized by a specific gravity within a range from 0.01 to 0.09, wherein the specific gravity is determined according to ASTM D1475.

34. The composition of any one of aspects 1 to 33, wherein the composition comprises from 2.8 wt % to 4.0 wt % of the low density filler, wherein the low density filler is characterized by a specific gravity within a range from 0.03 to 0.06, wherein the specific gravity is determined according to ASTM D1475.

35. The composition of any one of aspects 1 to 34, further comprising: from 10 wt % to 16 wt % of an inorganic filler; from 1.8 wt % to 3.8 wt % of an adhesion promoter; and from 0.2 wt % to 3 wt % of an epoxy-functional reactive diluent, wherein wt % is based on the total weight of the composition.

36. The composition of aspect 35, wherein the inorganic filler comprises precipitated calcium carbonate, hydrated alumina, fumed silica, calcium hydroxide, carbon black, or a combination off any of the foregoing.

37. The composition of any one of aspects 35 to 36, wherein the adhesion promoter comprises a phenolic adhesion promoter and an amine-functional silane.

38. The composition of any one of aspects 35 to 37, wherein the adhesion promoter comprises: from 45 wt % to 65 wt % of a phenolic adhesion promoter; and from 35 wt % to 55 wt % of an amine-functional silane, wherein wt % is based on the total weight of the adhesion promoter in the composition.

39. The composition of any one of aspects 37 to 38, wherein the phenolic adhesion promoter comprises the reaction product of a condensation reaction of a phenolic resin with one or more thiol-terminated polysulfides.

40. The composition of any one of aspects 37 to 39, wherein the phenolic adhesion promoter comprises a thiol-terminated phenolic adhesion promoter.

41. The composition of any one of aspects 37 to 40, wherein the amine-functional silane comprises; a primary amine-functional silane; a secondary amine-functional silane; or a combination thereof.

42. The composition of any one of aspects 37 to 41, wherein the amine-functional silane comprises; from 40 wt % to 60 wt % of a primary amine-functional silane; and from 40 wt % to 60 wt % of a secondary amine-functional silane; wherein wt % is based on the total weight of the amine-functional silane in a composition.

43. The composition of any one of aspects 35 to 42, wherein the epoxy-functional reactive diluent comprises an epoxy-functional reactive diluent.

44. The composition of any one of aspects 35 to 43, wherein the epoxy-functional reactive diluent comprises a monoepoxide, a polyepoxide, or a combination of any of the foregoing 45. The composition of any one of aspects 35 to 44, wherein the epoxy-functional reactive diluent comprises an epoxy-functional reactive diluent characterized by a weight average molecular weight from 100 Daltons to 1,000 Daltons, wherein the weight average molecular weight is determined by gel permeation chromatography, using a polystyrene standard, 46. The composition of any one of aspects 35 to 45, wherein the epoxy-functional reactive diluent comprises a glycidyl ether.

47. The composition of any one of aspects 35 to 46, wherein the epoxy-functional reactive diluent comprises an aliphatic diglycidyl ether.

48. The composition of any one of aspects 1 to 47, comprising: from 50 wt % to 70 wt % of the thiol-terminated polythioether prepolymer; from 15 wt % to 21 wt % of the polyepoxide; from 2.5 wt % to 4.0 wt % of the low density filler, wherein the low density filler is characterized by a specific gravity within a range from 0.01 to 0.09, wherein the specific gravity is determined according to ASTM D1475; from 10 wt % to 16 wt % of an inorganic filler; from 1.8 wt % to 3.8 wt % of an adhesion promoter; and from 0.2 wt % to 3 wt % of an epoxy-functional reactive diluent, wherein wt % is based on the total weight of the composition.

49. The composition of aspect 48, wherein, the polyepoxide comprises a diglycidyl ether of bisphenol A and a novolac epoxy resin, wherein the composition comprises: from 10 wt % to 25 wt % of the diglycidyl ether of bisphenol A; and from 0.2 wt % to 2 wt % of the novolac epoxy resin; and the adhesion promoter comprises a phenolic adhesion promoter and an amine-functional silane, wherein the composition comprises: from 1 wt % to 3 wt % of the phenolic adhesion promoter; and from 0.5 wt % to 2 wt % of the amine-functional silane; wherein wt % is based on the total weight of the composition.

50. The composition of any one of aspects 48 and 49, wherein the amine-functional silane comprises a primary amine-functional silane and a secondary amine-functional, wherein the composition comprises: from 0.4 wt % to 0.9 wt % of the primary amine-functional silane; and from 0.4 wt % to 0.9 wt % of the secondary amine-functional silane, wherein wt % is based on the total weight of the composition.

51. The composition of any one of aspects 1 to 47, comprising: from 50 wt % to 70 wt % of the thiol-terminated polythioether prepolymer; from 15 wt % to 21 wt % of the polyepoxide, wherein the polyepoxide comprises a diglycidyl ether of bisphenol A and a novolac epoxy resin, wherein the composition comprises: from 10 wt % to 25 wt % of the diglycidyl ether of bisphenol A, wherein the diglycidyl ether of bisphenol A comprises pendent hydroxyl groups; and from 0.2 wt % to 2 wt % of the novolac epoxy resin; from 2.5 wt % to 4.0 wt % of the low density filler, wherein the low density filler is characterized by a specific gravity within a range from 0.01 to 0.09, wherein the specific gravity is determined according to ASTM D1475; from 10 wt % to 16 wt % of the inorganic filler; from 1.8 wt % to 3.8 wt % of the adhesion promoter, wherein the adhesion promoter comprises a phenolic adhesion promoter and an amine-functional silane, wherein the composition comprises: from 1 wt % to 3 wt % of the phenolic adhesion promoter; and from 0.5 wt % to 2 wt % of the amine-functional silane; and from 0.2 wt % to 3 wt % of an epoxy-functional reactive diluent, wherein the epoxy-functional reactive diluent comprises an aliphatic diglycidyl ether, wherein wt % is based on the total weight of the composition.

52. A cured sealant prepared using the composition of any one of aspects 1 to 51.

53. The cured sealant of aspect 52, wherein the cured sealant exhibits a peel strength on Mil C-27725 and titanium C substrates of at least 25 pli/100% CF (4.38 N/mm/100% CF) following immersion in Jet Reference Fluid Type I for 120 days at 140° F. (60° C.), as determined according to AMS 3281.

54. The cured sealant of any one of aspects 52 to 53, wherein the cured sealant meets or exceeds the requirements for aerospace sealants as set forth in AMS 3277 and/or AMS 3281.

55. A part comprising the cured sealant of any one of aspects 52 to 54.

56. A method of sealing a part, comprising: applying the composition of any one of aspects 1 to 52 to at least one surface of a part; and curing the applied composition to seal the part.

57. A sealant system comprising a first component and a second component, wherein, the first component comprises: from 50 wt % to 70 wt % of a thiol-terminated polythioether; from 2.5 wt % to 4.0 wt % of a low density filler, wherein the low density filler is characterized by a specific gravity within a range from 0.01 to 0.09, wherein the specific gravity is determined according to ASTM D1475, wherein wt % is based on the total weight of the first component; and the second component comprises: from 75 wt % to 95 wt % of a polyepoxide, wherein wt % is based on the total weight of the second component, wherein the first component and the second component combined provide the composition of any one of aspects 1 to 52.

58. A cured sealant prepared using the system of claim 57.

59. The cured sealant of aspect 58, wherein the cured sealant exhibits a peel strength on Mil C-27725 and titanium C substrates of at least 25 pli/100% CF (4.38 N/mm/100% CF) following immersion in Jet Reference Fluid Type I for 120 days at 140° F. (60° C.), as determined according to AMS 3281.

60. The cured sealant of any one of aspects 58 to 59, wherein the cured sealant meets or exceeds the requirements for aerospace sealants as set forth in AMS 3277 and/or AMS 3281.

61. A part comprising the cured sealant of any one of aspects 58 to 60.

62. A method of sealing a part, comprising: combining the first component and the second component of the sealant system of claim 57 to provide a curable sealant composition; applying the curable sealant composition to at least one surface of a part; and curing the applied curable sealant composition to seal the part.

1A. A composition comprising: from 50 wt % to 70 wt % of a thiol-terminated polythioether prepolymer; from 15 wt % to 21 wt % of a polyepoxide; and from 35 vol % to 55 vol % of a low density filler, wherein, the low density filler is characterized by a specific gravity less than 0.1; and the low density filler comprises low density microcapsules comprise a coating of an aminoplast resin; wherein wt % is based on the total weight of the composition, and vol % is based on the total volume of the composition, and wherein the composition is characterized by a specific gravity less than 0.9, wherein the specific gravity is determined according to ASTM D1475 (modified).

2A. The composition of aspect 1A, wherein when cured, the cured composition meets or exceeds the requirements for aerospace sealants as set forth in AMS 3277 and/or AMS 3281.

3A. The composition of any one of aspects 1A to 2A, wherein the composition is characterized by a specific gravity within a range from 0.65 to 0.85, wherein the specific gravity is determined according to ASTM D1475 (modified).

4A. The composition of any one of aspects 1A to 3A, wherein the thiol-terminated polythioether prepolymer comprises the chemical structure of Formula (1):

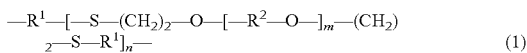

wherein,
each $R^1$ can independently comprise a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, or a —[(—$CHR^3$—)$_p$—X—]$_q$—(CHR$^3$)$_r$— group, wherein each $R^3$ can comprise from hydrogen or methyl;
each $R^2$ can independently comprise a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, or a —[(—$CH_2$—)$_p$—X—]$_q$—(CH$_2$)$_r$— group;
each X can independently comprise O, S, and —NR—, wherein R can comprise from hydrogen or methyl;
m ranges from 0 to 50;
n is an integer ranging from 1 to 60;
p is an integer ranging from 2 to 6;
q is an integer ranging from 1 to 5; and
r is an integer ranging from 2 to 10.

5A. The composition of any one of aspects 1A to 4A, wherein the polyepoxide comprises: from 86 wt % to 99 wt % of a hydroxyl-functional diglycidyl ether of bisphenol A; and from 1 wt % to 11 wt % of a novolac polyepoxide; wherein wt % is based on the total weight of the polyepoxide in the composition.

6A. The composition of any one of aspects 1A to 5A, wherein the composition comprises: from 86 wt % to 99 wt % of a hydroxyl-functional difunctional polyepoxide; and from 1 wt % to 11 wt % of a trifunctional polyepoxide, wherein wt % is based on the total weight of the polyepoxide in the composition.

7A. The composition of any one of aspects 1A to 6A, wherein the polyepoxide comprises: from 86 wt % to 99 wt % of the diglycidyl ether of bisphenol A; and from 1 wt % to 11 wt % of the novolac epoxy resin, wherein wt % is based on the total weight of the polyepoxide in the composition.

8A. The composition of any one of aspects 1A to 7A, wherein, the composition comprises from 2.8 wt % to 4.0 wt % of the low density filler; and the aminoplast resin comprises a urea-formaldehyde resin; and the coated low density microcapsules are characterized by a specific gravity within a range from 0.03 to 0.06, wherein the specific gravity is determined according to ASTM D1475.

9A. The composition of any one of aspects 1A to 8A, further comprising: from 10 wt % to 16 wt % of an inorganic filler; from 1.8 wt % to 3.8 wt % of an adhesion promoter; and from 0.2 wt % to 3 wt % of an epoxy-functional reactive diluent, wherein wt % is based on the total weight of the composition.

10A. The composition of aspect 9A, wherein the inorganic filler comprises precipitated calcium carbonate, hydrated alumina, fumed silica, calcium hydroxide, carbon black, or a combination off any of the foregoing.

11A. The composition of aspect 9A, wherein the adhesion promoter comprises: from 45 wt % to 65 wt % of a phenolic adhesion promoter; and from 35 wt % to 55 wt % of an amine-functional silane, wherein wt % is based on the total weight of the adhesion promoter in the composition.

12A. The composition of aspect 11A, wherein the amine-functional silane comprises: from 40 wt % to 60 wt % of a primary amine-functional silane; and from 40 wt % to 60 wt % of a secondary amine-functional silane; wherein wt % is based on the total weight of the amine-functional silane in a composition.

13A. The composition of aspect 9A, wherein the epoxy-functional reactive diluent comprises an epoxy-functional reactive diluent characterized by a weight average molecular weight from 100 Daltons to 1,000 Daltons, wherein the weight average molecular weight is determined by gel permeation chromatography, using a polystyrene standard, 14A. The composition of any one of aspects 1A to 13A, comprising: from 50 wt % to 70 wt % of the thiol-terminated polythioether prepolymer; from 15 wt % to 21 wt % of the polyepoxide; from 2.5 wt % to 4.0 wt % of the low density filler, wherein the low density filler is characterized by a specific gravity within a range from 0.01 to 0.09, wherein the specific gravity is determined according to ASTM D1475; from 10 wt % to 16 wt % of an inorganic filler; from 1.8 wt % to 3.8 wt % of an adhesion promoter; and from 0.2 wt % to 3 wt % of an epoxy-functional reactive diluent, wherein wt % is based on the total weight of the composition.

15A. The composition of aspect 14A, wherein, the polyepoxide comprises a diglycidyl ether of bisphenol A and a novolac epoxy resin, wherein the composition comprises: from 10 wt % to 25 wt % of the diglycidyl ether of bisphenol A; and from 0.2 wt % to 2 wt % of the novolac epoxy resin; and the adhesion promoter comprises a phenolic adhesion promoter and an amine-functional silane, wherein the composition comprises: from 1 wt % to 3 wt % of the phenolic adhesion promoter; and from 0.5 wt % to 2 wt % of the amine-functional silane; wherein wt % is based on the total weight of the composition.

16A. The composition of aspect 15A, wherein the amine-functional silane comprises a primary amine-functional silane and a secondary amine-functional, wherein the composition comprises: from 0.4 wt % to 0.9 wt % of the primary amine-functional silane; and from 0.4 wt % to 0.9 wt % of the secondary amine-functional silane, wherein wt % is based on the total weight of the composition.

17A. The composition of of any one of aspects 1A to 16A, comprising from 50 wt % to 70 wt % of the thiol-terminated polythioether prepolymer; from 15 wt % to 21 wt % of the polyepoxide, wherein the polyepoxide comprises a diglycidyl ether of bisphenol A and a novolac epoxy resin, wherein the composition comprises: from 10 wt % to 25 wt % of the diglycidyl ether of bisphenol A, wherein the diglycidyl ether of bisphenol A comprises pendent hydroxyl groups; and from 0.2 wt % to 2 wt % of the novolac epoxy resin; from 2.5 wt % to 4.0 wt % of the low density filler, wherein the low density filler is characterized by a specific gravity within a range from 0.01 to 0.09, wherein the specific gravity is determined according to ASTM D1475; from 10 wt % to 16 wt % of the inorganic filler; from 1.8 wt % to 3.8 wt % of the adhesion promoter, wherein the adhesion promoter comprises a phenolic adhesion promoter and an amine-functional silane, wherein the composition comprises: from 1 wt % to 3 wt % of the phenolic adhesion promoter; and from 0.5 wt % to 2 wt % of the amine-functional silane; and from 0.2 wt % to 3 wt % of an epoxy-functional reactive diluent, wherein the epoxy-functional reactive diluent comprises an aliphatic diglycidyl ether, wherein wt % is based on the total weight of the composition.

18A. A cured sealant prepared using the composition of any one of aspects 1A to 17A.

19A. The cured sealant of aspect 18A, wherein the cured sealant meets or exceeds the requirements for aerospace sealants as set forth in AMS 3277 and/or AMS 3281.

20A. A part comprising the cured sealant of aspect 18A.

21A. A method of sealing a part, comprising: applying the composition of any one of aspects 1A to 17A to at least one surface of a part; and curing the applied composition to seal the part.

22A. A sealant system comprising a first component and a second component, wherein, the first component comprises: from 50 wt % to 70 wt % of a thiol-terminated polythioether; from 2.5 wt % to 4.0 wt % of a low density filler, wherein, the low density filler is characterized by a specific gravity within a range from 0.01 to 0.09, wherein the specific gravity is determined according to ASTM D1475; and the low density filler comprises low density microcapsules comprising a coating of an aminoplast resin; wherein wt % is based on the total weight of the first component; and the second component comprises: from 75 wt % to 95 wt % of a polyepoxide, wherein wt % is based on the total weight of the second component, wherein the first component and the second component combined provide the composition of claim 1.

EXAMPLES

Embodiments provided by the present disclosure are further illustrated by reference to the following examples, which describe compositions and sealants provided by the present disclosure. It will be apparent to those skilled in the art that many modifications, both to materials, and to methods, may be practiced without departing from the scope of the disclosure.

A sealant (Sealant 1) was prepared by combining and mixing Part A and Part B.

Part A was prepared in a suitable container by adding the components listed in Table 1, beginning with the thiol-terminated polythioether prepolymers and phenolic adhesion promoters, then adding the calcium carbonate and silica, followed by the silanes, catalyst and finally the low density microcapsules.

TABLE 1

Part A formulation.

| Component | Wt % | Wt % |
|---|---|---|
| Permapol ® P3.1e Thiol-terminated polythioether[1] | 76.39 | 76.39 |
| Phenolic resin adhesion promoter[2] | 1.14 | 1.14 |
| Amine-functional silane adhesion promoter[3] | 1.6 | 1.60 |
| Inorganic filler[4] | 15.23 | 15.23 |
| Catalyst[5] | .69 | .69 |
| Low density aminoplast-coated microcapsules | 3.96 | 3.96 |
| Plasticizer, solvent, additives | 0.99 | 0.99 |
| Total | 100 | 100 |

[1]Combination of Permapol P3.1e 2.2 (75.8 g) and Permapol 3.1e 2.8 (0.91 g).
[2]Phenolic adhesion promoter (T-3920 and T-3921).
[3]Combination of primary aminosilane (0.8 g) and hindered silane (0.8 g).
[4]Combination of precipitated CaCO$_3$, hydrated alumina, fumed silica, and calcium hydroxide.
[5]DABCO ®

The low density aminoplast-coated particles were prepared, as described in U.S. Pat. No. 8,993,691, by combining a thermally expanded microcapsule such as Expancel® 091 DE 80 d30 (6 g; AkzoNobel), de-ionized water (551.8 g), and a melamine-formaldehyde resin (22.4 g; Cymel® 303; Cytec Industries Inc.). While stirring, a 10% para-toluene sulfonic acid solution (22.4 g; Sigma Aldrich) was added and the mixture heated to 60° C. and held for 2 hours. After removing the heat, a saturated sodium bicarbonate solution (13 g) was added and the mixture stirred for 10 min. Solids were filtered using a Buchner funnel, rinsed with distilled water, and allowed to dry at ambient temperature followed by drying for 24 hours at 49° C. The powder was sifted through a 250 micron sieve. The aminoplast resin coated microparticles had a specific gravity from 0.05 to 0.06.

Part B was prepared by combining and mixing the components listed in Table 2.

TABLE 2

Part B formulation.

| Component | Weight (g) | Wt % |
|---|---|---|
| Polyfunctional Epoxy[1] | 5.22 | 5.22 |
| Hydroxyl-functional Difunctional Epoxy[2] | 81.85 | 81.85 |
| Reactive diluent[3] | 4.97 | 4.97 |
| Carbon black | 0.44 | 0.44 |
| Phenolic adhesion promoter[4] | 3.01 | 3.01 |
| Inorganic filler[5] | 4.5 | 4.50 |
| Total | 100 | 100 |

[1]Novolac epoxy resin.
[2]Hydroxyl-functional diglycidyl ether of bisphenol A.
[3]Epoxy-functional reactive diluent.
[4]Phenolic adhesion promoter.
[5]Fumed silica.

For the sealant composition incorporating the low density melamine-coated microcapsules (Sealant 1), 100 g of part A and 26 g of part B were mixed by hand or in a SpeedMixer-DAC 600 FVZ, and the uniformly mixed material was applied to a substrate cured in accordance with AMS 3281.

The wt % for each of the components in the sealant composition incorprted the low density melamine-coated filler is listed in Table 3.

TABLE 3

Sealant Formulation combined Parts A and B.

| Component | Wt % |
|---|---|
| Permapol ® P3.1e Thiol-terminated polythioether | 60.6 |
| Phenolic adhesion promoter | 0.9 |
| Amine-functional silane adhesion promoter | 1.3 |
| Inorganic filler | 13.0 |
| Catalyst | .55 |
| Low density aminoplast-coated microcapsules | 3.1 |
| Plasticizer, solvent, and additive | 0.8 |
| Polyfunctional epoxy | 1.1 |
| Hydroxy-functional Difunctional Epoxy | 16.9 |
| Epoxy Reactive diluent | 1.0 |
| Carbon black | 0.1 |
| Total | 100 |

Two comparative sealant formulations were prepared.

Sealant 2 was similar to Sealant 1 except that the 3.96 wt % low denisty aminoplast resin-coated microcapsules (specific gravity from 0.05 to 0.06) in Part A were replaced with 2.04 wt % uncoated Expancel® 920 DE40 D30 microcapsules (specific gravity about 0.03) (AkzoNobel).

Sealant 3 was similar to Sealant 1, except that the 5.25 wt % low denisty aminoplast resin-coated microcapsules (specific gravity from 0.05 to 0.06) in Part A were replaced with 1.70 wt % uncoated Expancel® 920 DE80 D30 microcapsules (specific gravity about 0.03) (AkzoNobel).

For the sealant formulations incorporating lightweight Expancel® 920 DE40 D30 and Expancel® 920 DE80 D30 microcapsules, 1.62 wt % and 1.35 wt % of the lightweight microcapsules was used, repectively. The adjustment to the wt % of lightweight microcapsules was made so that the three sealant formulations evaluated had a similar specific gravity of about 0.75 (0.73 to 0.77) (see Table 4). For the sealant formulations incorporating Expancel® 920 DE40 D30, 100 g of part A was combined with 26.77 g of part B.

For sealant formulations incorporating Expancel® 920 DE80 D30, per 100 g of part A were combined with 26.87 g of part B.

The formulations were applied to Mil C-27725, anodized aluminum, Alodine® 1200, stainless steel, and titanium C test substrates.

The dry adhesion following a 14-day cure at ambient temperature was determined according to AMS 3181. Other measurements were made according to specification AMS—3281.

The results are presented in Table 4A and Table 4B.

TABLE 4A

Properties of cured sealants.

| Test Method AMS 3281 Paragraph | Property | Units | Sealant 2 | Sealant 3 | Sealant 1 |
|---|---|---|---|---|---|
| none | Amount low density filler | wt %, based on total weight | 1.62 | 1.35 | 3.15 |
| none | Amount low density filler | Estimated vol %, based on total weight | 39 | 34 | 43 |
| 3.6.2 | Viscosity | Poise | 19,600 | 14,000 | 14,000 |
|  |  | Pa-sec | 1,960 | 1,400 | 1,400 |
| 3.6.5 | Application Time | g/min at 2 h | 37 | 45 | 41 |
| 3.6.8 | Hardness | Shore A in 24 h | 35 | 33 | 35 |
| 3.6.12 | Hydrolytic stability | Shore A | 38 | 38 | 41 |
| 3.6.10 | Specific gravity in hexane | no unit | 0.73 | 0.76 | 0.77 |
| 3.6.17 | Thermal ruptures | at 300° F. 10 psi (149° C., 1.03 MPa), 30 min, after fluid immersion | did not pass | did not pass | passed |
| 3.6.22.1 | Standard dry cure | psi/% elongation | 214/297 | 217/317 | 228/375 |
|  |  | MPa/% elongation | 1.47/297 | 1.50/317 | 1.57 375 |

TABLE 4B

Adhesion of cured sealants to various substrates.

| Test Condition | Substrate | Sealant 2 | Sealant 3 | Sealant 1 |
|---|---|---|---|---|
| Dry 14 days cure | Mil C-27725 | 43 pli 100% CF | 39 pli 100% CF | 40 pli 100% CF |
|  | Anodized | 33 pli 100% CF | 38 pli 100% CF | 40 pli 100% CF |
|  | Alodine ® 1200 | 38 pli 100% CF | 45 pli 100% CF | 43 pli 100% CF |
|  | Stainless steel | 51 pli 100% CF | 54 pli 100% CF | 51 pli 100% CF |
|  | Titanium C | 44 pli 100% CF | 46 pli 100% CF | 52 pli 100% CF |
| 7 days at 140° F. (60° C.) in JRF Type I/ 3% NaCl | Mil C-27725 | 19/28 pli* 100% CF | 32/35 pli 100% CF | 46/53 pli 100% CF |
|  | Anodized | 21/21 pli 100% CF | 25/27 pli 100% CF | 37/41 pli 100% CF |
|  | Alodine ® 1200 | 28/27 pli 100% CF | No adhesion/30 pli 100% CF | 30/36 pli 100% CF |
|  | Stainless steel | 25/27 pli 100% CF | 29/34 pli 100% CF | 42/40 pli 100% CF |
|  | Titanium C | 29/27 pli 100% CF | 31/0 pli | 52/40 pli 100% CF |
| 70 days at 140° F. (60° C.) in JRF Type I/ 3% NaCl | Mil C-27725 | 22/23 pli 100% CF | 26/24 pli 100% CF | 32/32 pli 100% CF |
|  | Titanium C | 25/28 pli 100% CF | 25/25 pli 70% CF | 32/30 pli 100% CF |

TABLE 4B-continued

Adhesion of cured sealants to various substrates.

| Test Condition | Substrate | Sealant 2 | Sealant 3 | Sealant 1 |
|---|---|---|---|---|
| 120 days at 140° F. (60° C.) in JRF Type I only | Mil C-27725 | 20 pli 100% CF | —* | 33 pli 100% CF on BMS-565-010 |
| | Titanium C | 21 pli 100% CF | 21 pli 100% CF | 30 pli 100% CF on BMS-565-010 |

*Peel strength following immersion in JRF Type I was 19 pli (3.33 N/mm), with 100% cohesive failure; and the peel strength following immersion in 3% NaCl was 28 pli (4.90 N/mm).

Each of the compositions in Table 4 have a vol % loading of low density microcapsules between 30 vol % to 45 vol %, where vol % is based on the total volume of the composition, and had a similar specific gravity from 0.73 to 0.77. Sealant 1 is estimated to have 43 vol % low density filler; Sealant 2, 39 vol % low density filler; and Sealant 3, 34 vol % low density filler.

As shown in Table 4, even with substantial reformulation of the sealant composition, sealant compositions comprising uncoated expanded thermoplastic microcapsules at loadings around 30 vol % to 40 vol % (1.62 wt % and 1.35 wt % for the compositions comprising Expancel® 920 DE 40 D30 and Expancel® 920 DE80 ED30, respectively), exhibited a significant decrease in the adhesion strength following exposure to JRF Type I and 3% NaCl at high temperature.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   from 50 wt % to 70 wt % of a thiol-terminated polythioether prepolymer having an average thiol functionality from 2.05 to 2.8, wherein the thiol-terminated polythioether prepolymer comprises the chemical structure of Formula (1):

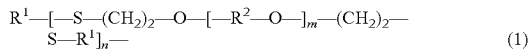

$$R^1\text{—}[\text{—S—}(CH_2)_2\text{—O—}[\text{—}R^2\text{—O—}]_m\text{—}(CH_2)_2\text{—S—}R^1]_n\text{—} \quad (1)$$

wherein,
   each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, and a —[(—CHR$^3$—)$_p$—X—]$_q$—(CHR$^3$)$_r$— group, wherein each $R^3$ is independently selected from hydrogen and methyl;
   each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—CH$_2$—)$_p$—X—]$_q$—(CH$_2$)$_r$— group;
   each X is independently selected from O, S, and —NR—, wherein R is selected from hydrogen and methyl;
   m ranges from 0 to 50;
   n is an integer ranging from 1 to 60;
   p is an integer ranging from 2 to 6;
   q is an integer ranging from 1 to 5; and
   r is an integer ranging from 2 to 10;
   from 15 wt % to 21 wt % of a polyepoxide; and
   from 35 vol % to 55 vol % of a low density filler, wherein,
      the low density filler is characterized by a specific gravity less than 0.1;
      the low density filler comprises low density microcapsules comprising a coating of an aminoplast resin;
      the aminoplast resin comprises a melamine-formaldehyde resin or a urea-formaldehyde resin; and
      the coated low density microcapsules are characterized by a specific gravity within a range from 0.03 to 0.06, wherein the specific gravity is determined according to ASTM D1475;
   wherein wt % is based on the total weight of the composition, and vol % is based on the total volume of the composition, and
   wherein the composition is characterized by a specific gravity less than 0.9, wherein the specific gravity is determined according to ASTM D1475 (modified).

2. The composition of claim 1, wherein when cured, the cured composition meets or exceeds the requirements for aerospace sealants as set forth in AMS 3277 and/or AMS 3281.

3. The composition of claim 1, wherein the composition is characterized by a specific gravity within a range from 0.65 to 0.85, wherein the specific gravity is determined according to ASTM D1475 (modified).

4. The composition of claim 1, wherein the polyepoxide comprises:
   from 86 wt % to 99 wt % of a hydroxyl-functional diglycidyl ether of bisphenol A; and
   from 1 wt % to 11 wt % of a novolac polyepoxide;
   wherein wt % is based on the total weight of the polyepoxide in the composition.

5. The composition of claim 1, wherein the composition comprises:
   from 86 wt % to 99 wt % of a hydroxyl-functional difunctional polyepoxide; and
   from 1 wt % to 11 wt % of a trifunctional polyepoxide,
   wherein wt % is based on the total weight of the polyepoxide in the composition.

6. The composition of claim 1, wherein the polyepoxide comprises:
   from 86 wt % to 99 wt % of the diglycidyl ether of bisphenol A; and
   from 1 wt % to 11 wt % of the novolac epoxy resin,
   wherein wt % is based on the total weight of the polyepoxide in the composition.

7. The composition of claim 1, wherein,
   the composition comprises from 2.8 wt % to 4.0 wt % of the low density filler; and the aminoplast resin comprises a melamine-formaldehyde resin or a urea-formaldehyde resin; and the coated low density microcapsules are characterized by a specific gravity within a range from 0.03 to 0.06, wherein the specific gravity is determined according to ASTM D1475.

8. The composition of claim 1, further comprising:
from 10 wt % to 16 wt % of an inorganic filler;
from 1.8 wt % to 3.8 wt % of an adhesion promoter; and
from 0.2 wt % to 3 wt % of an epoxy-functional reactive diluent,
wherein wt % is based on the total weight of the composition.

9. The composition of claim 8, wherein the inorganic filler comprises precipitated calcium carbonate, hydrated alumina, fumed silica, calcium hydroxide, carbon black, or a combination off any of the foregoing.

10. The composition of claim 8, wherein the adhesion promoter comprises:
from 45 wt % to 65 wt % of a phenolic adhesion promoter; and
from 35 wt % to 55 wt % of an amine-functional silane,
wherein wt % is based on the total weight of the adhesion promoter in the composition.

11. The composition of claim 10, wherein the amine-functional silane comprises;
from 40 wt % to 60 wt % of a primary amine-functional silane; and
from 40 wt % to 60 wt % of a secondary amine-functional silane;
wherein wt % is based on the total weight of the amine-functional silane in a composition.

12. The composition of claim 8, wherein the epoxy-functional reactive diluent comprises an epoxy-functional reactive diluent characterized by a weight average molecular weight from 100 Daltons to 1,000 Daltons, wherein the weight average molecular weight is determined by gel permeation chromatography, using a polystyrene standard.

13. The composition of claim 1, comprising:
from 50 wt % to 70 wt % of the thiol-terminated polythioether prepolymer;
from 15 wt % to 21 wt % of the polyepoxide;
from 2.5 wt % to 4.0 wt % of the low density filler, wherein the low density filler is characterized by a specific gravity within a range from 0.01 to 0.09, wherein the specific gravity is determined according to ASTM D1475;
from 10 wt % to 16 wt % of an inorganic filler;
from 1.8 wt % to 3.8 wt % of an adhesion promoter; and
from 0.2 wt % to 3 wt % of an epoxy-functional reactive diluent,
wherein wt % is based on the total weight of the composition.

14. The composition of claim 13, wherein,
the polyepoxide comprises a diglycidyl ether of bisphenol A and a novolac epoxy resin, wherein the composition comprises:
from 10 wt % to 25 wt % of the diglycidyl ether of bisphenol A; and
from 0.2 wt % to 2 wt % of the novolac epoxy resin; and
the adhesion promoter comprises a phenolic adhesion promoter and an amine-functional silane, wherein the composition comprises:
from 1 wt % to 3 wt % of the phenolic adhesion promoter; and
from 0.5 wt % to 2 wt % of the amine-functional silane;

wherein wt % is based on the total weight of the composition.

15. The composition of claim 14, wherein the amine-functional silane comprises a primary amine-functional silane and a secondary amine-functional, wherein the composition comprises:
from 0.4 wt % to 0.9 wt % of the primary amine-functional silane; and
from 0.4 wt % to 0.9 wt % of the secondary amine-functional silane,
wherein wt % is based on the total weight of the composition.

16. The composition of claim 1, comprising:
from 50 wt % to 70 wt % of the thiol-terminated polythioether prepolymer;
from 15 wt % to 21 wt % of the polyepoxide, wherein the polyepoxide comprises a diglycidyl ether of bisphenol A and a novolac epoxy resin, wherein the composition comprises:
from 10 wt % to 25 wt % of the diglycidyl ether of bisphenol A, wherein the diglycidyl ether of bisphenol A comprises pendent hydroxyl groups; and
from 0.2 wt % to 2 wt % of the novolac epoxy resin;
from 2.5 wt % to 4.0 wt % of the low density filler, wherein the low density filler is characterized by a specific gravity within a range from 0.01 to 0.09, wherein the specific gravity is determined according to ASTM D1475;
from 10 wt % to 16 wt % of the inorganic filler;
from 1.8 wt % to 3.8 wt % of the adhesion promoter, wherein the adhesion promoter comprises a phenolic adhesion promoter and an amine-functional silane, wherein the composition comprises:
from 1 wt % to 3 wt % of the phenolic adhesion promoter; and
from 0.5 wt % to 2 wt % of the amine-functional silane; and
from 0.2 wt % to 3 wt % of an epoxy-functional reactive diluent, wherein the epoxy-functional reactive diluent comprises an aliphatic diglycidyl ether,
wherein wt % is based on the total weight of the composition.

17. A cured sealant prepared using the composition of claim 1.

18. The cured sealant of claim 17, wherein the cured sealant meets or exceeds the requirements for aerospace sealants as set forth in AMS 3277 and/or AMS 3281.

19. A part comprising the cured sealant of claim 17.

20. A method of sealing a part, comprising:
applying the composition of claim 1 to at least one surface of a part; and
curing the applied composition to seal the part.

21. A sealant system comprising a first component and a second component, wherein,
the first component comprises:
from 50 wt % to 70 wt % of a thiol-terminated polythioether having an average thiol functionality from 2.05 to 2.8, wherein the thiol-terminated polythioether prepolymer comprises the chemical structure of Formula (1):

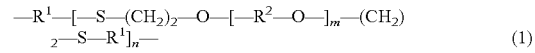

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, and a —[(—CHR$^3$—)$_p$—X—]$_q$—(CHR$^3$)$_r$— group, wherein each R$^3$ is independently selected from hydrogen and methyl;

each R$^2$ is independently selected from a C$_{2-10}$ n-alkanediyl group, a C$_{3-6}$ branched alkanediyl group, a C$_{6-8}$ cycloalkanediyl group, a C$_{6-14}$ alkanecycloalkanediyl group, a heterocyclic group, and a —[(—CH$_2$—)$_p$—X—]$_q$—(CH$_2$)$_r$— group;

each X is independently selected from O, S, and —NR—, wherein R is selected from hydrogen and methyl;

m ranges from 0 to 50;

n is an integer ranging from 1 to 60;

p is an integer ranging from 2 to 6;

q is an integer ranging from 1 to 5; and r is an integer ranging from 2 to 10;

from 2.5 wt % to 4.0 wt % of a low density filler, wherein, the low density filler is characterized by a specific gravity within a range from 0.01 to 0.09, wherein the specific gravity is determined according to ASTM D1475; and the low density filler comprises low density microcapsules comprising a coating of an aminoplast resin;

the aminoplast resin comprises a melamine-formaldehyde resin or a urea-formaldehyde resin; and the coated low density microcapsules are characterized by a specific gravity within a range from 0.03 to 0.06, wherein the specific gravity is determined according to ASTM D1475;

wherein wt % is based on the total weight of the first component; and the second component comprises:

from 75 wt % to 95 wt % of a polyepoxide, wherein wt % is based on the total weight of the second component, wherein the first component and the second component combined provide the composition of claim 1.

* * * * *